United States Patent
Kwak et al.

(10) Patent No.: US 12,294,427 B2
(45) Date of Patent: May 6, 2025

(54) ELECTRONIC DEVICE PERFORMING PRECODING DETECTION FOR ADAPTIVE CHANNEL ESTIMATION AND OPERATING METHOD THEREOF

(71) Applicant: Samsung Electronics Co., Ltd., Suwon-si (KR)

(72) Inventors: Gyoungil Kwak, Suwon-si (KR); Jinho Kim, Suwon-si (KR); Sunyoung Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 14 days.

(21) Appl. No.: 18/492,187

(22) Filed: Oct. 23, 2023

(65) Prior Publication Data

US 2024/0137081 A1    Apr. 25, 2024
US 2024/0235627 A9    Jul. 11, 2024

(30) Foreign Application Priority Data

Oct. 24, 2022   (KR) .................. 10-2022-0137765
Jul. 12, 2023   (KR) .................. 10-2023-0090487

(51) Int. Cl.
  *H04B 7/0456*   (2017.01)
  *H04L 5/00*     (2006.01)
  *H04L 25/02*    (2006.01)

(52) U.S. Cl.
  CPC ......... *H04B 7/0456* (2013.01); *H04L 5/0048* (2013.01); *H04L 25/0202* (2013.01)

(58) Field of Classification Search
  CPC .......... H04B 2201/70701; H04B 1/707; H04B 7/005; H04B 1/7115; H04B 1/7117;
  (Continued)

(56) References Cited

U.S. PATENT DOCUMENTS 9,319,252 B2 *  4/2016  Li .................. H04W 48/12
10,771,133 B2   9/2020  Lin
(Continued)

FOREIGN PATENT DOCUMENTS

WO    2021035458 A1    3/2021

OTHER PUBLICATIONS

CATT: "On DL Transmission scheme 2", 3GPP Draft; R1-1706191, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017 Apr. 4, 2017 (Apr. 4, 2017), XP051252470, Retrieved from the Internet: URL:https://www.3gpp.org/ftp/tsg_ran/WG1_RL1/TSGR1_88b/Docs/<https://url.us.m.mimecastprotect.com/s/9LMuCjRvZ5Hyn2Q2TW-tsL?domain=3gpp.org> [retrieved on Apr. 4, 2017].
(Continued)

*Primary Examiner* — Eva Y Puente
(74) *Attorney, Agent, or Firm* — Harness, Dickey & Pierce, P.L.C.

(57) ABSTRACT

An electronic device includes processing circuitry configured to calculate an intra metric based on cross correlation of first reference signal symbols (RSs) included in a first precoding resource block group (PRG) to which a target resource element (RE) belongs, calculate an inter metric based on cross correlation of one or more second RSs and one or more among the first RSs, the one or more second RSs being included in a second PRG adjacent to the first PRG along a frequency axis of a physical channel, the one or more second RSs being in proximity to the target RE, and the physical channel being received from a base station, compare a first ratio between the intra metric and the inter metric with a threshold ratio to obtain a comparison result,
(Continued)

and determine a channel estimation mode with respect to the target RE based on the comparison result.

20 Claims, 22 Drawing Sheets

(58) Field of Classification Search
CPC .... H04B 17/309; H04B 1/712; H04B 7/0845; H04L 25/0204; H04L 25/0202; H04L 5/0048; H04L 25/0228; H04L 25/022; H04L 25/0212; H04L 27/2647; H04L 25/0224; H04W 72/20; H04W 24/00; H04W 24/08; H04W 16/28; H04W 48/16; H04W 24/10; H04W 48/20; H04W 24/02
See application file for complete search history.

(56) References Cited

U.S. PATENT DOCUMENTS

| | | | |
|---|---|---|---|
| 10,805,122 B2 | 10/2020 | Kim et al. | |
| 11,196,528 B2 | 12/2021 | Li et al. | |
| 11,387,877 B2 | 7/2022 | Jeon et al. | |
| 11,405,138 B2 | 8/2022 | Gao et al. | |
| 11,431,384 B2 | 8/2022 | Jin et al. | |
| 11,438,046 B2 | 9/2022 | Dai et al. | |
| 2012/0170540 A1* | 7/2012 | Khan | H04B 7/0656 370/328 |
| 2019/0007181 A1 | 1/2019 | Marinier et al. | |
| 2019/0260611 A1* | 8/2019 | Jiang | H04L 5/005 |
| 2020/0136690 A1* | 4/2020 | Noh | H04L 5/001 |
| 2020/0274740 A1* | 8/2020 | Kim | H04L 25/03305 |
| 2022/0021558 A1* | 1/2022 | Chen | H04L 25/0202 |
| 2022/0190887 A1 | 6/2022 | Wang et al. | |

OTHER PUBLICATIONS

Samsung: "PRB bundling for Rel-10", 3GPP Draft; R1-103016 PRB_BOUNDLING_IN_REL10, 3rd Generation Partnership Project (3GPP), Mobile Competence Centre; 650, Route Des Lucioles; F-06921 Sophia-Antipolis Cedex; France, vol. RAN WG1, No. Montreal, Canada; May 10, 2010, May 4, 2010 (May 4, 2010), XP050420114, [retrieved on May 4, 2010].
Extended European Search Report, dated Mar. 12, 2024, issued in European Patent Application No. 23205347.0.

* cited by examiner

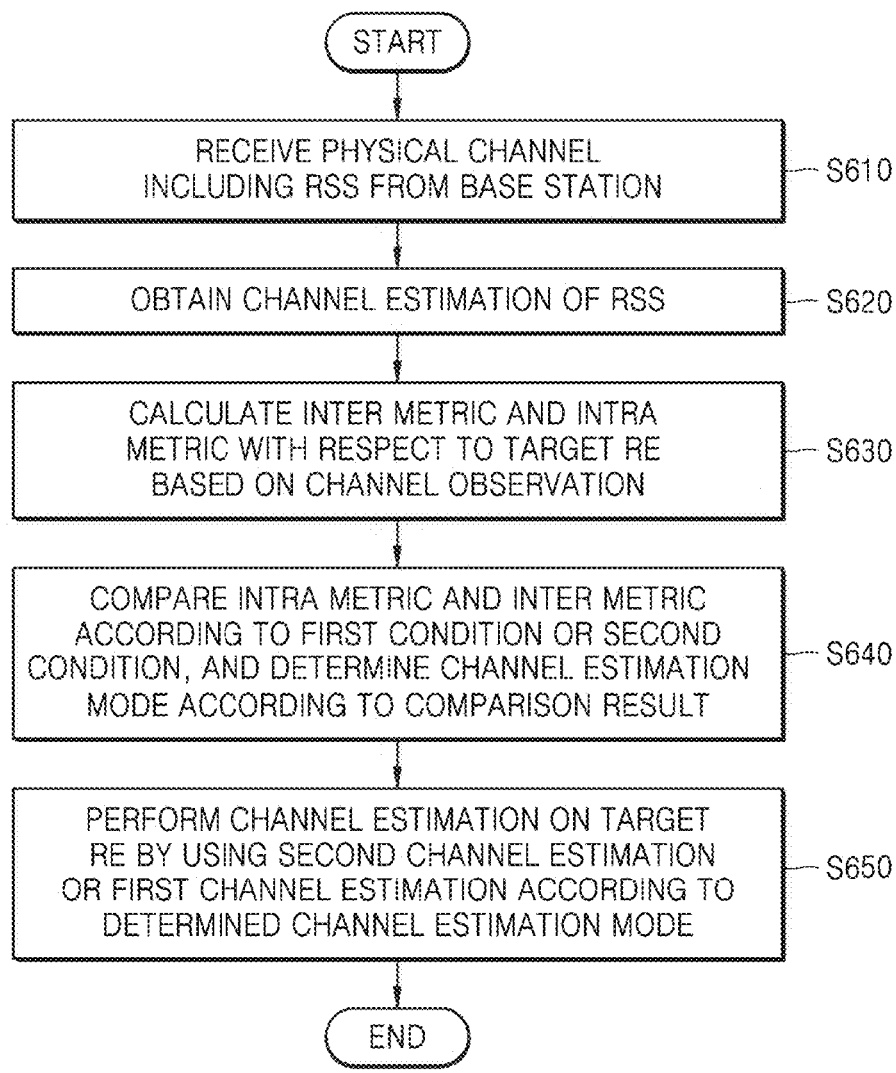

ELECTRONIC DEVICE PERFORMING PRECODING DETECTION FOR ADAPTIVE CHANNEL ESTIMATION AND OPERATING METHOD THEREOF

CROSS-REFERENCE TO RELATED APPLICATION

This application is based on and claims priority under 35 U.S.C. § 119 to Korean Patent Application Nos. 10-2022-0137765, filed on Oct. 24, 2022, and 10-2023-0090487, filed on Jul. 12, 2023, in the Korean Intellectual Property Office, the disclosures of which are incorporated by reference herein in their entireties.

BACKGROUND

The inventive concepts relate to an electronic device performing precoding detection, and more particularly, to an electronic device performing precoding detection for adaptive channel estimation and an operating method thereof.

To meet the growing demand for wireless data traffic after the commercialization of a 4th generation (4G) communication system, efforts are being made to develop an improved 5th generation (5G) communication system or a pre-5G communication system. For this reason, the 5G communication system or the pre-5G communication system is called a Beyond 4G Network communication system or a Post Long Term Evolution (LTE) system.

A base station may transmit a signal by dividing a frequency side of the signal into precoding resource block group (PRG) units and applying different precoding thereto in order to increase the transmission rate in a multi-transmission environment. However, in the related art, there is no procedure for determining whether precodings between neighboring PRG are same, and only channel observations of reference signals of the PRG to which a target RE belongs are unconditionally used. Therefore, when a resource element (RE) at the edge of the PRG is the target RE, a challenge in which error in channel estimation increases occurs.

SUMMARY

Embodiments address the above-mentioned challenge. The inventive concepts provide an electronic device adaptively performing channel estimation by detecting whether precoding between neighboring precoding resource block groups (PRGs) are the same (or similar) and an operating method thereof.

According to an aspect of the inventive concepts, there is provided an electronic device including processing circuitry configured to calculate an intra metric based on cross correlation of a plurality of first reference signal symbols (RSs) included in a first precoding resource block group (PRG) to which a target resource element (RE) belongs, calculate an inter metric based on cross correlation of one or more second RSs and one or more among the plurality of first RSs, the one or more second RSs being included in a second PRG adjacent to the first PRG along a frequency axis of a physical channel, the one or more second RSs being in proximity to the target RE, and the physical channel being received from a base station, compare a first ratio between the intra metric and the inter metric with a threshold ratio to obtain a comparison result, and determine a channel estimation mode with respect to the target RE based on the comparison result.

According to an aspect of the inventive concepts, there is provided an electronic device including processing circuitry configured to calculate an intra metric based on cross correlation of a plurality of first reference signal symbols (RSs) included in a first precoding resource block group (PRG) to which a target resource element (RE) belongs, calculate an inter metric based on cross correlation of one or more second RSs and one or more among the plurality of first RSs, the one or more second RSs being included in a second PRG adjacent to the first PRG along a frequency axis of a physical channel, the one or more second RSs being in proximity to the target RE, and the physical channel being received from a base station, perform a first comparison between a magnitude of the intra metric and a first threshold value to obtain a first comparison result, perform a second comparison between a magnitude of the inter metric and a second threshold value to obtain a second comparison result, and determine a channel estimation mode with respect to the target RE based on the first comparison result and the second comparison result.

According to an aspect of the inventive concepts, there is provided an operating method of an electronic device including calculating an intra metric based on cross correlation of a plurality of first reference signal symbols (RSs) included in a first precoding resource block group (PRG) to which a target resource element (RE) belongs, calculating an inter metric based on cross correlation between one or more second RSs and one or more among the plurality of first RSs, the one or more second RSs being included in a second PRG adjacent to the first PRG along a frequency axis of a physical channel, the one or more second RSs being in proximity to the target RE, the physical channel being received from a base station, determining a channel estimation mode with respect to the target RE based on the intra metric and the inter metric to obtain a determined channel estimation mode, and performing channel estimation on the target RE according to the determined channel estimation mode.

BRIEF DESCRIPTION OF THE DRAWINGS

Embodiments will be more clearly understood from the following detailed description taken in conjunction with the accompanying drawings in which:

FIG. 6 is a flowchart illustrating an operating method of an electronic device according to embodiments;

DETAILED DESCRIPTION

Hereinafter, embodiments of the inventive concepts will be described in detail with reference to the accompanying drawings.

Figure 1A:
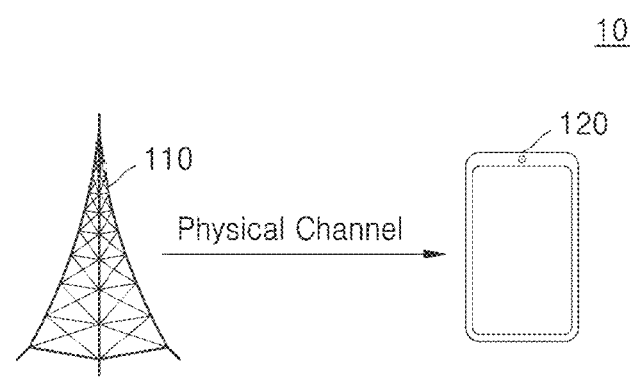
FIG. 1A illustrates a wireless communication system according to embodiments.
Figure 1B:
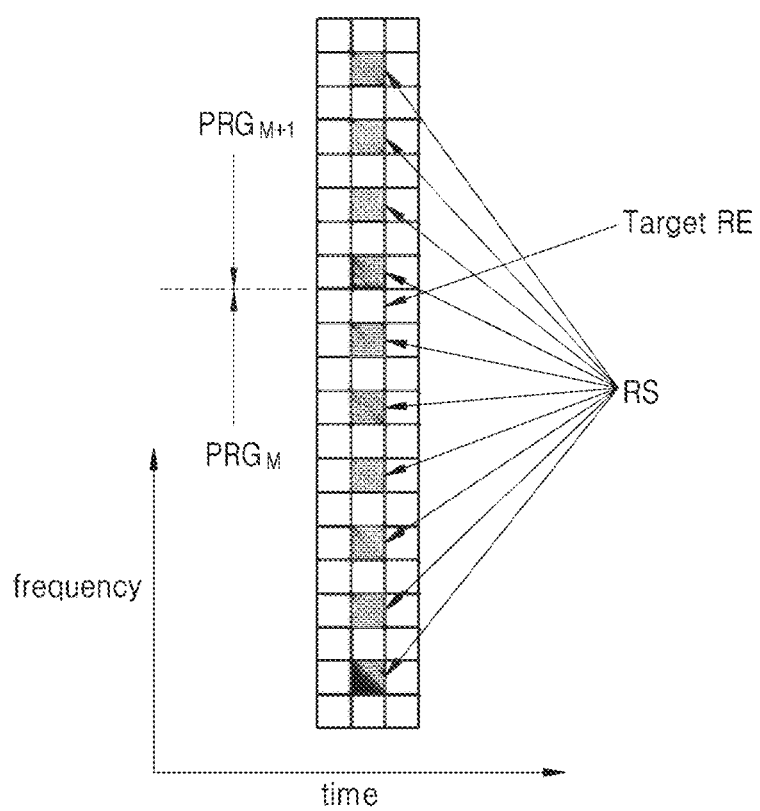
FIG. 1B illustrates an example of a physical channel including reference signals.

FIG. 1A illustrates a wireless communication system according to embodiments. FIG. 1B illustrates an example of a physical channel including reference signals.

Referring to FIG. 1A, a wireless communication system 10 may include a base station 110 and/or an electronic device 120.

According to embodiments, the base station 110 is a network infrastructure that provides wireless access to the electronic device 120. The base station 110 may have coverage defined as a certain geographical area based on a distance over which signals may be transmitted. The base station 110 may be replaced with (e.g., be implemented as) an 'access point (AP)', 'eNodeB (eNB)', '5th generation (5G) node', 'wireless point' or other terms having an equivalent technical meaning.

According to embodiments, the base station 110 may be connected to one or more 'transmission/reception points (TRPs)'. The base station 110 may transmit a downlink signal to or receive an uplink signal from the electronic device 120 through the one or more TRPs. According to embodiments, the base station 110 may transmit a physical channel to the electronic device 120. For example, the physical channel may include at least a Physical Downlink Shared CHannel (PDSCH), a Physical Broadcast CHannel (PBCH), or a Physical Downlink Control CHannel (PDCCH). The physical channel may further include a reference signal. The base station 110 may generate the physical channel by precoding a transmission signal to be transmitted to the electronic device 120. Resources of the physical channel may be divided into precoding resource block group (PRG) units. The PRG may indicate a resource unit to which the same (or a similar) precoding (e.g., a common precoding) is applied. For example, the base station 110 may apply a separate precoding for each PRG.

Referring to FIG. 1B together with FIG. 1A, the physical channel may include RSs. The RSs may refer to symbols of the reference signal disposed for each resource at a certain interval along a frequency axis. For example, the RSs may include at least a DeModulation Reference Signal (DMRS) of a PDSCH, a DMRS of a PDCCH, and/or a DMRS of a PBCH. The base station 110 may perform precoding on an (M)-th PRG and may perform precoding on an (M+1)-th PRG. In this regard, the precoding applied to the (M)-th PRG may be the same as (or similar to) or different from the precoding applied to the (M+1)-th PRG. That is, precoding applied to RSs belonging to (e.g., contained in) the (M)-th PRG may be different from precoding applied to RSs belonging to (e.g., contained in) the (M+1)-th PRG.

In FIG. 1B, the RSs are disposed at one resource interval but are not limited thereto. According to embodiments, an interval between the RSs may be at least two or more resource elements (REs), and the size of each of the RSs may also be (e.g., may be the same as or similar to) at least two or more REs.

The electronic device 120 may perform channel estimation on a target RE. The target RE may be a resource allocated to an edge of the (M)-th PRG (e.g., an RE nearest to an adjacent PRG, such as the (M+1)-th PRG, among REs of the (M)-th PRG in a frequency domain). For example, the target RE may be included in the (M)-th PRG and may be adjacent to the (M+1)-th PRG. According to embodiments, adjacent PRGs may be PRGs assigned frequency resources directly adjacent (higher frequencies or lower frequencies) to one another. According to embodiments, when the precoding applied to the (M)-th PRG and the precoding applied to the (M+1)-th PRG are the same as (or similar to) each other, the electronic device 120 may perform channel estimation on the target RE included in the (M)-th PRG using not only channel observation values of the RSs included in the (M)-th PRG, but also channel observation values of the RSs included in the (M+1)-th PRG. According to embodiments, when the precoding applied to the (M)-th PRG and the precoding applied to the (M+1)-th PRG are different from each other, the electronic device 120 may perform channel estimation on the target RE based on channel observation values of RSs included in a PRG (e.g., the (M)-th PRG) including the target RE. That is, when precoding of the (M)-th PRG is different from precoding of the (M+1)-th PRG, the electronic device 120 may use only channel observation values of RSs included in the same PRG as (or a similar PRG to) the target RE for channel estimation on the target RE (e.g., without using channel observation values of the RSs included in the (M+1)-th PRG). Accordingly, the electronic device 120 may determine whether precoding of the (M)-th PRG and precoding of the (M+1)-th PRG are the same as (or similar to) each other in order to determine RSs of channel observation values to be used for channel estimation on the target RE.

According to embodiments, the electronic device 120 is a device used by a user and may communicate with the base station 110 through a wireless channel. The electronic device 120 may be replaced with (e.g., may be implemented as) a 'user equipment (UE)', 'mobile station', 'subscriber station', 'customer premises equipment' (CPE), 'remote terminal', 'wireless terminal', or 'user device', or other terms having an equivalent technical meaning, besides a terminal.

Figure 2:
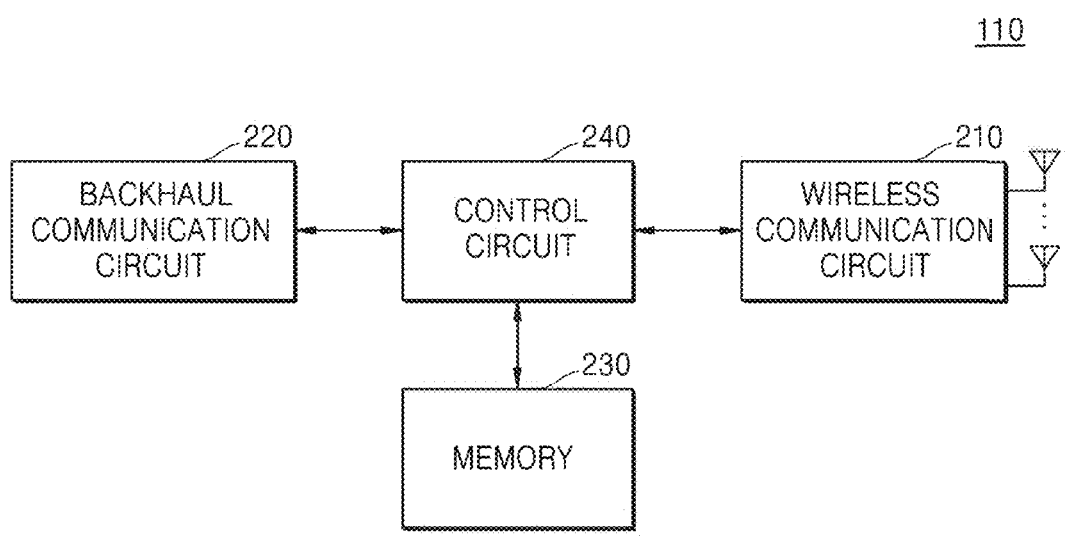
FIG. 2 is a block diagram of a base station according to embodiments.

FIG. 2 is a block diagram of a base station according to embodiments.

Referring to FIG. 2, the base station 110 may include a wireless communication circuit 210, a backhaul communication circuit 220, a memory 230, and/or a control circuit 240.

The wireless communication circuit 210 may perform functions for transmitting and receiving signals through a wireless channel. According to embodiments, the wireless communication circuit 210 may perform a conversion function between a baseband signal and a bit string according to a physical layer standard of a system. For example, when transmitting data, the wireless communication circuit 210 may generate complex symbols by encoding and modulating a transmitted bit stream, and, when receiving data, restore a received bit stream by demodulating and decoding the baseband signal. In addition, the wireless communication circuit 210 may up-convert the baseband signal into a radio frequency (RF) band signal and transmit the RF band signal through an antenna, and/or down-convert the RF band signal received through the antenna into the baseband signal. To this end, the wireless communication circuit 210 may include a transmit filter, a receive filter, an amplifier, a mixer, an oscillator, a digital to analog converter (DAC), an analog to digital converter (ADC), etc.

The wireless communication circuit 210 may transmit and receive signals. For example, the wireless communication circuit 210 may transmit a synchronization signal (SS), a reference signal, system information, a message, control information, and/or data. Also, the wireless communication circuit 210 may perform beamforming. The wireless communication circuit 210 may apply a beamforming weight to a signal to be transmitted and received in order to give directionality to the signal. The wireless communication circuit 210 may repeatedly transmit the signal by changing a formed beam.

The backhaul communication circuit 220 may provide an interface for communicating with other nodes within a network. That is, the backhaul communication circuit 220 may convert a bit stream transmitted from the base station 110 to another node, for example, another connection node, another base station, an upper node, a core network, etc. into a physical signal, and convert the physical signal received from another node into a bit stream.

The memory 230 may store data such as a basic program, an application program, setting information, etc., for operation of the base station 110. The memory 230 may include volatile memory, non-volatile memory, or a combination of volatile memory and non-volatile memory.

The control circuit 240 may control operations of the base station 110. For example, the control circuit 240 may transmit and receive signals through the wireless communication circuit 210 and/or the backhaul communication circuit 220. Also, the control circuit 240 may write data to and read data from the memory 230. To this end, the control circuit 240 may include at least one processor. According to embodiments, the control circuit 240 may transmit the physical channel by precoding a signal to be transmitted to the electronic device 120. As described above with reference to FIG. 1B, the control circuit 240 may divide the transmission signal into PRGs, which are minimum (e.g., smallest) units to which precoding is applied, according to frequencies, and apply precoding to each PRG. For example, precoding applied to the (M)-th PRG of FIG. 1B may be different from precoding applied to the (M+1)-th PRG.

Figure 3:
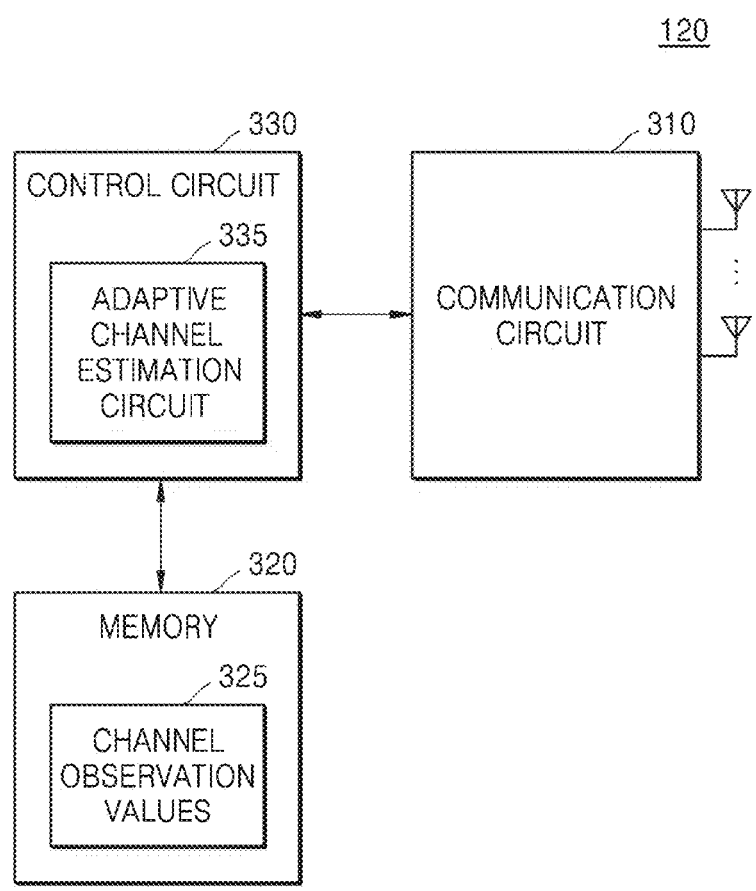
FIG. 3 is a block diagram of an electronic device according to embodiments.

FIG. 3 is a block diagram of the electronic device 120 according to embodiments.

Referring to FIG. 3, the electronic device 120 may include a communication circuit 310, a memory 320, and/or a control circuit 330.

The communication circuit 310 may perform functions for transmitting and receiving signals through a wireless channel. For example, the communication circuit 310 may perform a conversion function between a baseband signal and a bit string according to a physical layer standard of a system. For example, when transmitting data, the communication circuit 310 may generate complex symbols by encoding and modulating a transmitted bit stream, and, when receiving data, restore a received bit stream by demodulating and decoding the baseband signal. In addition, the communication circuit 310 may up-convert the baseband signal into an RF band signal and then transmit the RF band signal through an antenna, or down-convert the RF band signal received through the antenna into a baseband signal. For example, the communication circuit 310 may include a transmit filter, a receive filter, an amplifier, a mixer, an oscillator, a DAC, an ADC, etc. The communication circuit 310 may perform beamforming. The communication circuit 310 may apply a beamforming weight to a signal to be transmitted and received in order to give directionality to the signal.

The communication circuit 310 may transmit and receive signals. The communication circuit 310 may receive a downlink signal and/or transmit an uplink signal. The downlink signal may include an SS, a reference signal, system information, a configuration message, control information, and/or downlink data. For example, the communication circuit 310 may receive a downlink physical channel (e.g., PDSCH, PDCCH, and PBCH) including a reference signal from the base station 110.

The memory 320 may store data such as a basic program, an application program, setting information, etc., for operating the electronic device 120. The memory 320 may include volatile memory, non-volatile memory, or a combination of volatile memory and non-volatile memory. Also, the memory 320 may provide stored data according to a request of the control circuit 330.

According to embodiments, the memory 320 may store channel observation values 325. The channel observation values 325 may correspond to result values of channel estimation on RSs. The memory 320 may provide channel observation values 325 of RSs according to the request of the control circuit 330. For example, when an (M)-th PRG and an (M+1)-th PRG are based on the same precoding (or similar precoding), the memory 320 may provide channel observation values 325 of N RSs in the order adjacent to a target RE in the (M)-th PRG among a plurality of RSs and channel observation values 325 of N RSs in the order adjacent to the target RE in the (M+1)-th PRG to the control circuit 330, and the 2N channel observation values 325 may be referred to for channel estimation on the target RE. N may be variable based on the size of a filter tap of a minimum (or smallest) mean square error (MMSE). For example, N may be 3 based on a 6-tap MMSE. In another example, when the (M)-th PRG and the (M+1)-th PRG are based on different precoding, the memory 320 may provide channel observation values 325 of 2N RSs in the order adjacent to the target RE in the (M)-th PRG among the plurality of RSs to the control circuit 330. N may be variable based on the size of the filter tap of the MMSE.

The control circuit 330 may control overall operations of the electronic device 120. For example, the control circuit 330 may transmit and receive signals through the communication circuit 310. Also, the control circuit 330 may write to and read data from the memory 320. To this end, the control circuit 330 may include at least one processor or microprocessor, or may be a part of the processor. When the control circuit 330 is part of the processor, a part of the communication circuit 310 and the control circuit 330 may be referred to as a communication processor (CP).

According to embodiments, the control circuit 330 may further include an adaptive channel estimation circuit 335. The adaptive channel estimation circuit 335 may adaptively determine RSs that are targets of channel observation values 325 to be used when performing channel estimation on the target RE. The adaptive channel estimation circuit 335 may determine whether precoding between neighboring PRGs (e.g., the (M)-th PRG and the (M+1)-th PRG) are the same (or similar) in order to determine RSs that are the targets of channel observation values 325 to be used for channel estimation on the target RE. For example, the adaptive channel estimation circuit 335 may calculate a metric for measuring cross correlation between RSs of the (M+1)-th PRG adjacent to RSs of the (M)-th PRG, and determine whether the calculated metric satisfies an arbitrary condition to determine whether precoding of the (M)-th PRG and precoding of the (M+1)-th PRG are the same (or similar) or different. When precoding of the (M)-th PRG and precoding of the (M+1)-th PRG are different from each other, the adaptive channel estimation circuit 335 may perform per-PRG channel estimation using only the RSs of the (M)-th PRG including the target RE (hereinafter referred to as first channel estimation). When precoding of the (M)-th PRG and precoding of the (M+1)-th PRG are the same (or similar), the adaptive channel estimation circuit 335 may perform across-PRG channel estimation using all of channel observation values of the RSs of the (M+1)-th PRG adjacent to the (M)-th PRG as well as the (M)-th PRG including the target RE (hereinafter referred to as second channel estimation). A detailed description of each of the first channel estimation and the second channel estimation is described below.

Figure 4:
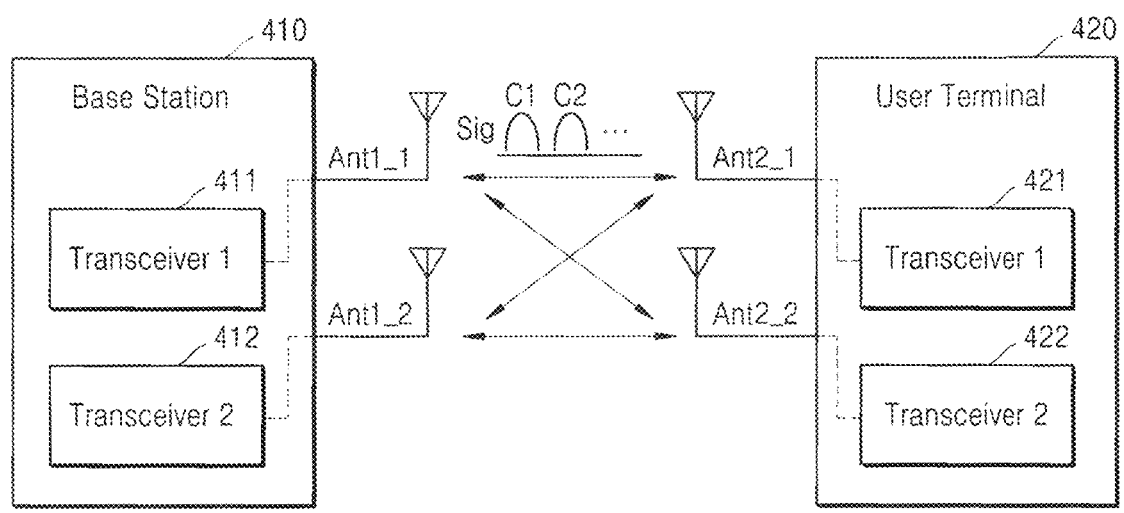
FIG. 4 illustrates a multiple input multiple output (MIMO) environment according to embodiments.

FIG. 4 illustrates a multiple input multiple output (MIMO) environment according to embodiments.

Referring to FIG. 4, a base station 410 and a user terminal 420 may communicate with each other using a MIMO method. The user terminal 420 may correspond to the electronic device 120, and the base station 410 may correspond to the base station 110. To this end, the base station 410 and the user terminal 420 may include a plurality of antennas Ant1_1 and Ant1_2, and Ant2_1 and Ant2_2, respectively. In FIG. 4, the base station 410 and the user terminal 420 include the two antennas Ant1_1 and Ant1_2, and Ant2_1 and Ant2_2, respectively, but are not limited thereto. The technical idea of the inventive concepts may also be applied to embodiments in which each of the base station 410 and the user terminal 420 includes two or more antennas.

The base station 410 may include a first transceiver 411, a second transceiver 412, a first antenna Ant1_1, and/or a second antenna Ant1_2. The first transceiver 411 and the second transceiver 412 may each be connected to one antenna. For example, the first transceiver 411 may be connected to the first antenna Ant1_1 and the second transceiver 412 may be connected to the second antenna Ant1_2. When the base station 410 operates as a transmitting device, the first transceiver 411 and the second transceiver 412 may operate as transmitters, and when the base station 410 operates as a receiving device, the first transceiver 411 and the second transceiver 412 may operate as receivers.

The first transceiver 411 may generate a first signal Sig by merging a first component carrier signal C1 and a second component signal C2 in a transmission mode, and output the generated first signal Sig to the user terminal 420. The first transceiver 411 may extract not only the first component carrier C1 but also the second component carrier C2 from the first signal Sig (e.g., in a receiving mode). Each of the first transceiver 411 and the second transceiver 412 may not transmit only one component carrier signal but may merge and transmit a plurality of component carrier signals, and extract not only one component carrier signal but also a plurality of component carrier signals from the first signal Sig. The user terminal 420 may include a third transceiver 421, a fourth transceiver 422, a third antenna Ant2_1, and/or a fourth antenna Ant2_2. The user terminal 420 may be substantially the same as or similar to the base station 410, and thus, a description thereof is omitted.

Figure 5A:
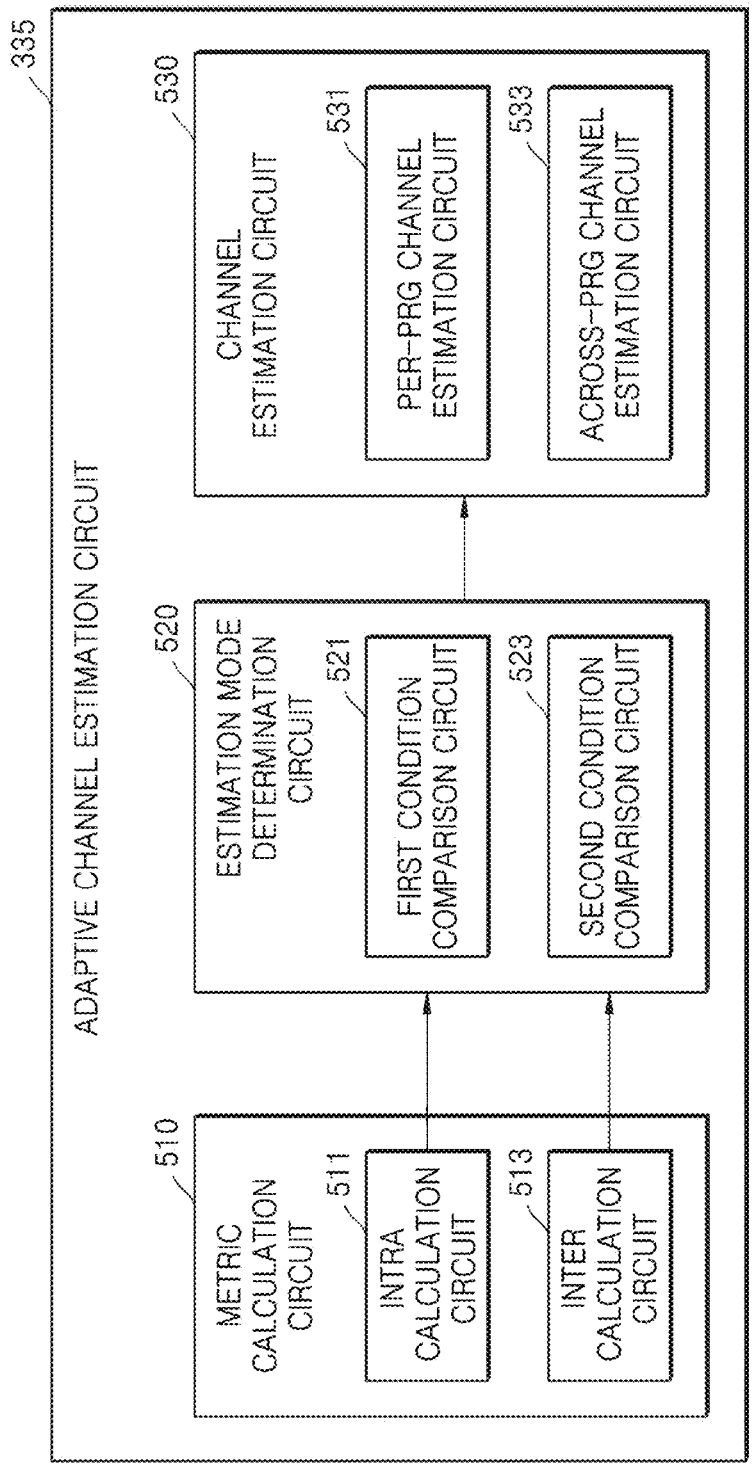
FIG. 5A illustrates a detailed block diagram of an adaptive channel estimation circuit according to embodiments.
Figure 5B:
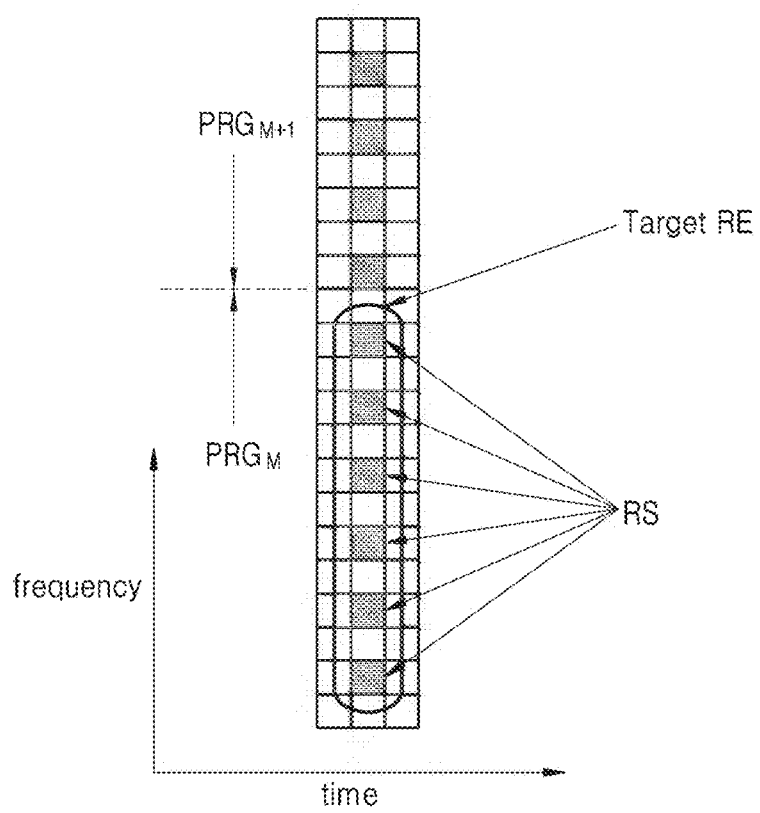
FIG. 5B illustrates an example of channel estimation when precodings between neighboring precoding resource block groups (PRGs) are different according to embodiments.
Figure 5C:
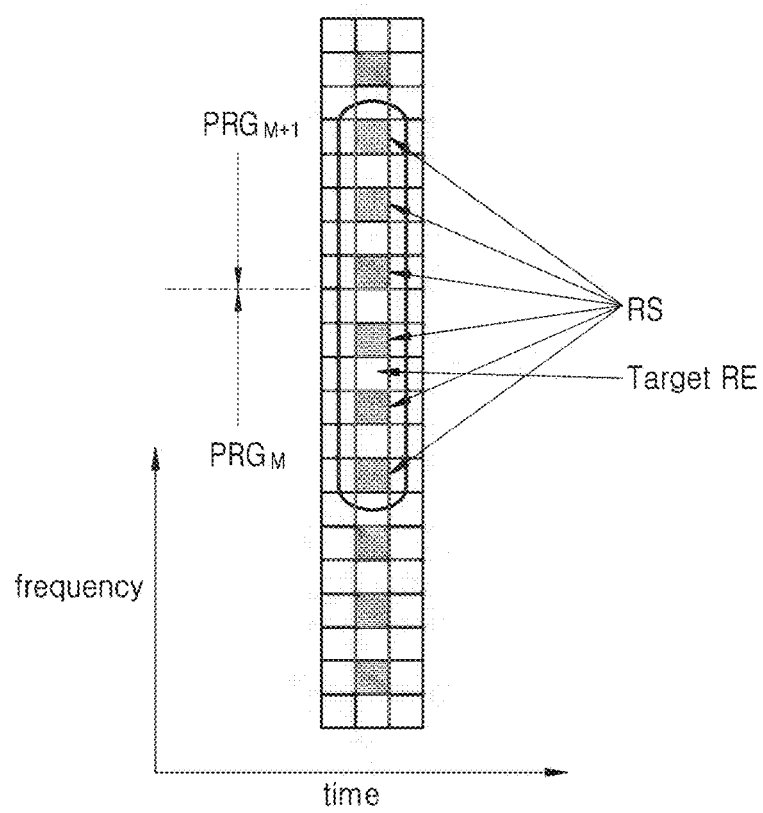
FIG. 5C illustrates another example of channel estimation when precodings between neighboring PRGs are the same (or similar) according to embodiments.

FIG. 5A illustrates a detailed block diagram of an adaptive channel estimation circuit 335 according to embodiments, FIG. 5B illustrates an example of channel estimation when precodings between neighboring PRG are different according to embodiments, and FIG. 5C illustrates another example of channel estimation when precodings between neighboring PRG are the same/identical (or similar) according to embodiments.

Referring to FIG. 5A, the adaptive channel estimation circuit 335 may include a metric calculation circuit 510, an estimation mode determination circuit 520, and/or a channel estimation circuit 530. According to embodiments, the metric calculation circuit 510 may generate a metric for determining whether precoding between the (M)-th PRG and the adjacent (M+1)-th PRG is the same/identical (or similar). For example, the metric may include an INTRA metric and an INTER metric. The metric calculation circuit 510 may further include an intra calculation circuit 511 for calculating an intra metric and an inter calculation circuit 513 for calculating an inter metric.

When channel observation values, which are a kth subcarrier index and an lth symbol index of an ith Rx antenna and a jth Tx antenna, are expressed as $H_{i,j}(k,l)$, a result of intra-PRG cross correlation obtained by normalizing channel observation values belonging to the (M)-th PRG of the th Rx antenna and the jth Tx antenna in a frequency axis may be defined as an intra metric, and the intra calculation circuit 511 may calculate the intra metric according to the following equation.

[Equation 1]
$$INTRA_{i,j}(M, D, l \cdot \Delta) \triangleq \frac{1}{N_{intraCorr}} \sum_{n=0}^{N_{intraCorr}-1} H_{i,j}^*(k_M + Dn, l)H_{i,j}(k_M + D(n+1) + \Delta, l)$$

A result of inter-PRG cross correlation obtained by normalizing the channel observation values belonging to the (M)-th PRG of the ith Rx antenna and the jth Tx antenna and channel observation values belonging to the (M+1)-th PRG in the frequency axis may be defined as an inter metric, and the inter calculation circuit 513 may calculate the inter metric according to the following equation.

$$INTER_{i,j}(M, M+1, D, l, \Delta) \stackrel{\Delta}{=}$$

$$\frac{1}{N_{InterCorr}} \sum_{n=0}^{N_{InterCorr}-1} H_{i,j}^*(k_{M+1} + Dn - \Delta, l) H_{i,j}(k_{M+1} + Dn, l)$$

[Equation 2]

Here, $k_M$ denotes a specific carrier index belonging to the (M)-th PRG, $k_{M+1}$ denotes a specific carrier index belonging to the (M+1)-th PRG, D denotes a carrier unit distance between adjacent channel observations, and $\Delta$ denotes a carrier unit distance between channel observations for calculating a metric. In general, $\Delta$, which is the distance between channel observations, may be a value specified according to a standard, or may be a unit of one carrier corresponding to a distance between primarily estimated channels. $\Delta$ may be variably configurable. l denotes an orthogonal frequency-division multiplexing (OFDM) symbol index. In addition, $N_{IntraCorr}$ denotes the number of intra-PRG cross correlations performed between channel observations in a PRG, and $N_{InterCorr}$ denotes the number of inter-PRG cross correlations performed between channel observations of the (M)-th PRG and the (M+1)-th PRG. $N_{IntraCorr}$ and $N_{InterCorr}$ may be variably configurable. For example, in 3GPP new radio (NR) PDSCH, when the number of RSs present in the PRG is $N_{RS}$, it may be a value of $$N_{IntraCorr} = N_{RS} - \frac{\Delta}{D}, N_{InterCorr} = \frac{\Delta}{D}.$$

According to embodiments, i, j and n may each be respective integers.

The intra calculation circuit 511 and the inter calculation circuit 513 may calculate the intra metric and the inter metric based on Equations 1 and 2, respectively, and provide each of the calculated metrics to the estimation mode determination circuit 520.

According to embodiments, the estimation mode determination circuit 520 may receive the intra metric and the inter metric from the metric calculation circuit 510, and compare the received metrics to determine whether an arbitrary condition is satisfied. The estimation mode determination circuit 520 may determine whether precoding between adjacent PRGs are the same (or similar) according to whether a comparison result of the metric satisfies the arbitrary condition, and further determine whether precoding is based on first channel estimation or second channel estimation.

The estimation mode determination circuit 520 may further include a first condition comparison circuit 521 and a second condition comparison circuit 523. The estimation mode determination circuit 520 may determine a condition according to the control signal, for determining whether precoding between adjacent PRGs are the same (or similar) based on at least one of the first condition comparison circuit 521 or the second condition comparison circuit 523.

According to embodiments, the first condition comparison circuit 521 may determine whether precoding between adjacent PRGs are the same (or similar) based on a ratio between metrics. For example, the first condition comparison circuit 521 may calculate a ratio of the magnitude of the intra metric to the magnitude of the inter metric, and compare whether the calculated ratio is greater than or equal to a threshold ratio (e.g., a threshold ratio value). That is, the first condition comparison circuit 521 may determine whether a first condition is satisfied based on Equation 3. When a comparison result satisfies the first condition, it may be determined that precoding of the (M)-th PRG and precoding of the (M+1)-th PRG are the same (or similar).

$$\frac{|INTER_{i,j}(M, M+1, D, l, \Delta)|}{|INTRA_{i,j}(M, D, l, \Delta)|} \geq \lambda_{0,i,j}$$

[Equation 3]

In this regard, $\lambda_{0,i,j}$ may additionally use (e.g., be based on) information which are variable according to channel, such as Doppler shift, delay spread, signal to noise ratio (SNR), channel selectivity, etc., and may be configurable.

According to embodiments, the second condition comparison circuit 523 may determine whether precoding between adjacent PRGs are the same (or similar) based on the intra metric and the inter metric. For example, the second condition comparison circuit 523 may compare whether the magnitude of the intra metric is greater than or equal to a first threshold value and whether the magnitude of the inter metric is greater than or equal to a second threshold value. That is, the first condition comparison circuit 521 may determine whether a second condition is satisfied based on Equation 4. When a comparison result satisfies the second condition, it may be determined that precoding of the (M)-th PRG and the (M+1)-th PRG are the same (or similar).

$$|INTRA_{i,j}(M,D,l,\Delta)| \geq \lambda_{1,i,j}$$

$$|INTER_{i,j}(M,M+1,D,l,\Delta)| \geq \lambda_{2,i,j}$$

[Equation 4]

In this case, $\lambda_{1,i,j}, \lambda_{2,i,j}$ may additionally use (e.g., may each be based on) variable information such as Doppler shift, delay spread, SNR, channel selectivity, etc., according to a channel, and may be configurable.

The estimation mode determination circuit 520 may provide a control signal to the channel estimation circuit 530 according to whether a condition is satisfied. For example, when the first condition or the second condition, based on the inter metric and the intra metric, is satisfied, precoding between adjacent PRGs are the same (or similar), and accordingly, channel observations of RSs inside the adjacent PRGs may be used. Accordingly, the estimation mode determination circuit 520 may generate a control signal instructing activation of an across-PRG channel estimation circuit 533. In another example, when the first condition or the second condition, based on the inter metric and the intra metric, is not satisfied, precoding between adjacent PRGs are different, and accordingly, only channel observations of RSs inside the PRG including a target RE may be used. Accordingly, the estimation mode determination circuit 520 may generate a control signal instructing activation of a per-PRG channel estimation circuit 531.

The channel estimation circuit 530 may receive a control signal from the estimation mode determination circuit 520 and perform channel estimation on the target RE according to either first channel estimation (hereinafter referred to as per-PRG channel estimation) or second channel estimation (hereinafter referred to as across-PRG channel estimation). The channel estimation circuit 530 may activate either the per-PRG channel estimation circuit 531 or the across-PRG channel estimation circuit 533 based on the control signal received from the estimation mode determination circuit 520 to perform channel estimation on the target RE. Specifically, the per-PRG channel estimation circuit 531 may be activated when precoding between adjacent PRGs are different. That is, the per-PRG channel estimation circuit 531 may be activated when the first condition is not satisfied or the second condition is not satisfied. Referring to FIG. 5B together with FIG. 5A, the per-PRG channel estimation circuit 531 may perform channel estimation on the target RE using only channel observations of RSs included in the PRG (e.g., the (M)-th PRG) including the target RE. The across-PRG channel estimation circuit 533 may be activated when precoding between adjacent PRGs are the same (or similar). That is, the across-PRG channel estimation circuit 533 may be activated when the first condition is satisfied or the second condition is satisfied. Referring to FIG. 5C together with FIGS. 5A-5B, the across-PRG channel estimation circuit 533 may perform channel estimation on the target RE by using all channel observations of RSs included in the PRG (e.g., the (M)-th PRG) including the target RE, as well as the PRG (e.g., the (M+1)-th PRG) to which the target RE does not belong but is adjacent. According to embodiments, the across-PRG channel estimation circuit 533 may perform channel estimation on the target RE by using channel observations of at least one among RSs included in the PRG (e.g., the (M)-th PRG) including the target RE, as well as at least one among RSs included in the PRG (e.g., the (M+1)-th PRG) to which the target RE does not belong but is adjacent. According to embodiments, a first quantity of RSs included in the PRG including the target RE, and/or a second quantity of RSs included in the PRG to which the target RE does not belong but is adjacent, of which the channel observations are used to perform channel estimation may be based on a carrier unit distance between channel observations.

According to the above-described example, the intra calculation circuit 511 of the metric calculation circuit 510 calculates the intra metric according to Equation 1, and the inter calculation circuit 513 of the metric calculation circuit 510 calculates the inter metric according to Equation 2, but embodiments are not limited thereto.

According to embodiments, the intra calculation circuit 511 may calculate the intra metric according to Equation 5 below instead of Equation 1.

$$INTRA_{i,j}(M, D, l \cdot \Delta) \triangleq \frac{1}{N_{intraCorr}}$$

$$\sum_{n=0}^{N_{intraCorr}-1} \left\| H^*_{i,j}(k_M + Dn, l) H_{i,j}(k_M + D(n+1) + \Delta, l) \right\|^2$$

[Equation 5]

Also, the inter calculation circuit 513 may calculate the inter metric according to Equation 6 below instead of Equation 2.

$$INTER_{i,j}(M, M+1, D, l, \Delta) \triangleq \frac{1}{N_{InterCorr}}$$

$$\sum_{n=0}^{N_{InterCorr}-1} \left\| H^*_{i,j}(k_{M+1} + Dn - \Delta, l) H_{i,j}(k_{M+1} + Dn, l) \right\|^2$$

[Equation 6]

According to embodiments, the estimation mode determination circuit 520 may determine a condition according to the control signal, for determining whether precoding between adjacent PRGs are the same (or similar) based on at least one of the first condition comparison circuit 521 or the second condition comparison circuit 523. When the intra metric is calculated based on Equation 5 and the inter metric is calculated based on Equation 6, the first condition comparison circuit 521 does not determine whether precoding between adjacent PRGs are the same (or similar) based on the ratio between metrics in Equation 3, but may determine whether precoding between adjacent PRGs are the same (or similar) based on Equation 7 below.

$$\left| 1 - \frac{|INTER_{i,j}(M, M+1, D, l, \Delta)|}{|INTRA_{i,j}(M, D, l, \Delta)|} \right| \leq \lambda_{0,i,j}$$

[Equation 7]

When the intra metric is calculated based on Equation 5 and the inter metric is calculated based on Equation 6, the second condition comparison circuit 523 does not compare whether the magnitude of the intra metric is greater than or equal to the first threshold value and whether the magnitude of the inter metric is greater than or equal to the second threshold value in Equation 4 but may determine whether precoding between adjacent PRGs are the same (or similar) based on Equation 8 below.

$$||INTRA_{i,j}(M,D,l,\Delta) - INTER_{i,j}(M,M+1,D,l,\Delta)| \leq \lambda_{1,i,j}$$

$$|INTRA_{i,j}(M,M+1,D,l,\Delta)| \leq \lambda_{2,i,j}$$

[Equation 8]

That is, when the intra metric is calculated according to Equation 5 and the inter metric is calculated according to Equation 6, and when a difference between the intra metric and the inter metric is smaller than (or equal to) $\lambda_{1,i,j}$ and the magnitude of the intra metric is smaller than (or equal to) $\lambda_{2,i,j}$, it may be determined that precoding of the (M)-th PRG and precoding of the (M+1)-th PRG are the same (or similar).

FIG. 6 is a flowchart illustrating an operating method of the electronic device 120 according to embodiments.

Referring to FIG. 6, in operation S610, the electronic device 120 may receive a physical channel including RSs from the base station 110. The physical channel may be a signal on which the same (e.g., identical) precoding (or similar precoding) is performed according to a carrier unit having a certain size. The carrier unit of the certain size may correspond to a PRG unit. For example, the physical channel may include at least one among a PDSCH, a PDCCH, and/or a PBCH.

In operation S620, the electronic device 120 may obtain channel estimation values of RSs.

In operation S630, the electronic device 120 may calculate an inter metric and an intra metric with respect to a target RE based on channel observations on the RSs. For example, the metric calculation circuit 510 of the adaptive channel estimation circuit 335 may calculate an intra metric based on channel observations on the RSs. The intra metric may be calculated based on a cross correlation between RSs included in a PRG including the target RE. For example, the metric calculation circuit 510 may calculate an intra metric based on channel observations on the RSs. The inter metric may be calculated based on a cross correlation between RSs of the PRG including the target RE and an adjacent PRG.

In operation S640, the electronic device 120 may compare the intra metric and the inter metric according to a first condition or a second condition and adaptively determine a channel estimation mode according to a comparison result. The first condition is to determine whether the ratio of the magnitude of the inter metric to the magnitude of the intra metric is greater than or equal to a threshold ratio. The second condition is to determine (1) whether the magnitude of the intra metric is greater than or equal to a first threshold value, and (2) whether the magnitude of the inter metric is greater than or equal to a second threshold value. The estimation mode determination circuit 520 may determine whether the intra metric and the inter metric satisfy the first condition or the second condition, and when the first condition or the second condition is satisfied, determine a second mode for performing channel estimation on the target RE using channel observations on RSs of adjacent PRGs. When the first condition or the second condition is not satisfied, the estimation mode determination circuit 520 may determine a first mode for performing channel estimation on the target RE by using channel observations on RSs of the PRG including the target RE.

In operation S650, the electronic device 120 may perform channel estimation on the target RE by using second channel estimation (e.g., across-PRG channel estimation) or first channel estimation (e.g., per-PRG channel estimation) according to the determined channel estimation mode. For example, when the estimation mode determination circuit 520 determines the first mode, the channel estimation circuit 530 may receive a control signal instructing the first mode and perform first channel estimation (e.g., per-PRG channel estimation) corresponding to the first mode. For example, when the estimation mode determination circuit 520 determines the second mode, the channel estimation circuit 530 may receive a control signal instructing the second mode and perform second channel estimation (e.g., across-PRG channel estimation) corresponding to the second mode. According to embodiments, after operation S650 is completed, the electronic device 120 (e.g., the communication circuit 310) may generate and transmit a communication signal (e.g., transmitted to the base station 110) based on a result of the channel estimation (e.g., the across-PRG channel estimation).

Figure 7:
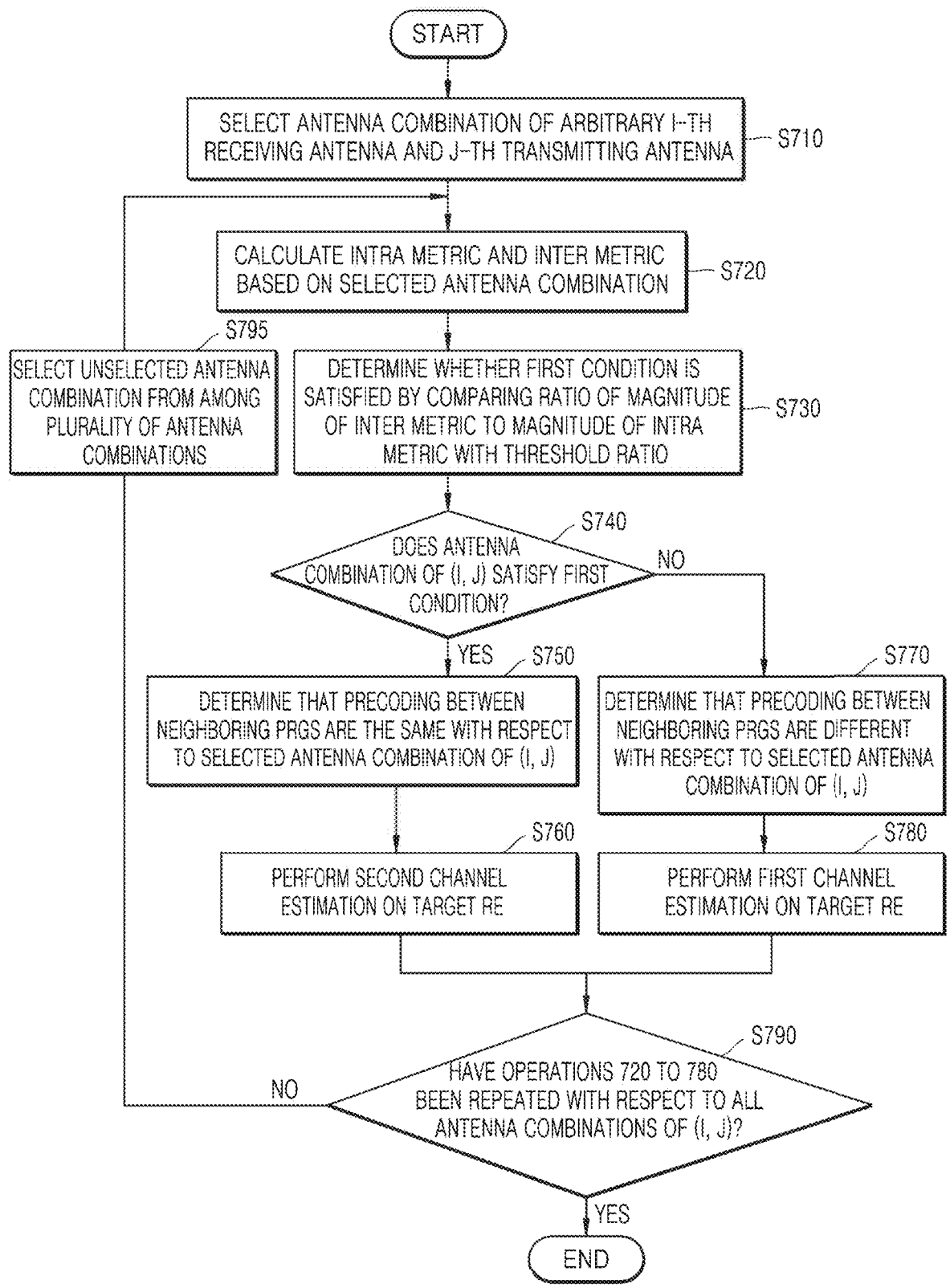
FIG. 7 is a flowchart illustrating an operating method of performing channel estimation for each antenna combination according to embodiments.

FIG. 7 is a flowchart illustrating an operating method of performing channel estimation for each antenna combination according to embodiments.

Referring to FIG. 7, in operation S710, the electronic device 120 may select an antenna combination of an arbitrary i-th receiving antenna and a j-th transmitting antenna. For example, in the case of the MIMO system of FIG. 4, i may be 1 or 2, and j may be 1 or 2. In another example, in the case of a 4×4 MIMO system, i may be any of 1 to 4 and j may be any one of 1 to 4. According to embodiments, the electronic device 120 may start with i=1 and j=1 in operation 710.

In operation S720, the electronic device 120 may calculate an intra metric and an inter metric based on the selected antenna combination. As described above, the metric calculation circuit 510 may calculate the intra metric with respect to the i-th receiving antenna and the j-th transmitting antenna by using Equation 1 or Equation 5. The metric calculation circuit 510 may calculate the inter metric with respect to the i-th receiving antenna and the j-th transmitting antenna by using Equation 2 or Equation 6.

In operation S730, the electronic device 120 may determine whether the first condition is satisfied by comparing a ratio of the magnitude of the inter metric to the magnitude of the intra metric with a threshold ratio. The estimation mode determination circuit 520 may compare a value, obtained by dividing the magnitude of the inter metric by the magnitude of the intra metric, with the threshold ratio. When the divided value is equal to or exceeds the threshold ratio, the estimation mode determination circuit 520 may determine that the first condition is satisfied. The estimation mode determination circuit 520 may determine that the first condition is not satisfied when the divided value is smaller than the threshold ratio.

In operation S740, the electronic device 120 may determine whether the antenna combination of (i, j) satisfies the first condition and may perform operation S750 when the first condition is satisfied. When the first condition is not satisfied, the electronic device 120 may perform operation S770.

In operation S750, the electronic device 120 may determine that precoding between neighboring PRGs are the same (or similar) with respect to the selected antenna combination of (i, j). That is, because it is determined that the first condition is satisfied in operation S740, the (M)-th th PRG and the (M+1)-th PRG of a signal received to the i-th receiving antenna of the electronic device 120 from the j-th transmitting antenna of the base station 110 may be based on the same precoding (or similar precoding).

In operation S760, the electronic device 120 may perform second channel estimation (e.g., across-PRG channel estimation) on a target RE. Because the (M)-th PRG and the (M+1)-th PRG are based on the same precoding (or similar precoding), the electronic device 120 may perform channel estimation on the target RE by using channel observations of RSs included in a PRG to which the target RE belongs, as well as RSs included in adjacent PRGs and close to the target RE. According to embodiments, the RSs included in an adjacent PRG and close to the target RE may refer to one or more RSs at frequencies nearest to an edge between the adjacent PRG and the PRG to which the target RE belongs. According to embodiments, a quantity of the one or more RSs may be based on a carrier unit distance between channel observations.

In operation S770, the electronic device 120 may determine that precoding between neighboring PRGs are different with respect to the selected antenna combination of (i, j). That is, because it is determined in operation S740 that the first condition is not satisfied, the (M)-th PRG and the (M+1)-th PRG of the signal received by the i-th receiving antenna of the electronic device 120 from the j-th transmitting antenna of the base station 110 may be based on different precoding.

In operation S780, the electronic device 120 may perform first channel estimation (e.g., per-PRG channel estimation) on the target RE. Because the (M)-th PRG and the (M+1)-th PRG are based on different precoding, the RSs included in adjacent PRGs and close to the target RE may be based on different precoding. Accordingly, the channel estimation circuit 530 may perform channel estimation on the target RE by using channel observations of the RSs included in the PRG to which the target RE belongs.

In operation S790, the electronic device 120 may determine whether operations S720 to S780 have been repeated with respect to all antenna combinations. The electronic device 120 may repeat operations S720 to S780 described above for every antenna combination. The electronic device 120 may end the procedure when operations S720 to S780 have been repeated with respect to all combinations of the i-th receiving antenna and the j-th transmission antenna. When operations S720 to S780 have not been repeated with respect to all antenna combinations, the electronic device 120 may select a previously unselected antenna combination in operation S795, return to operation S720 and repeat operations S730 to 780.

Figure 8:
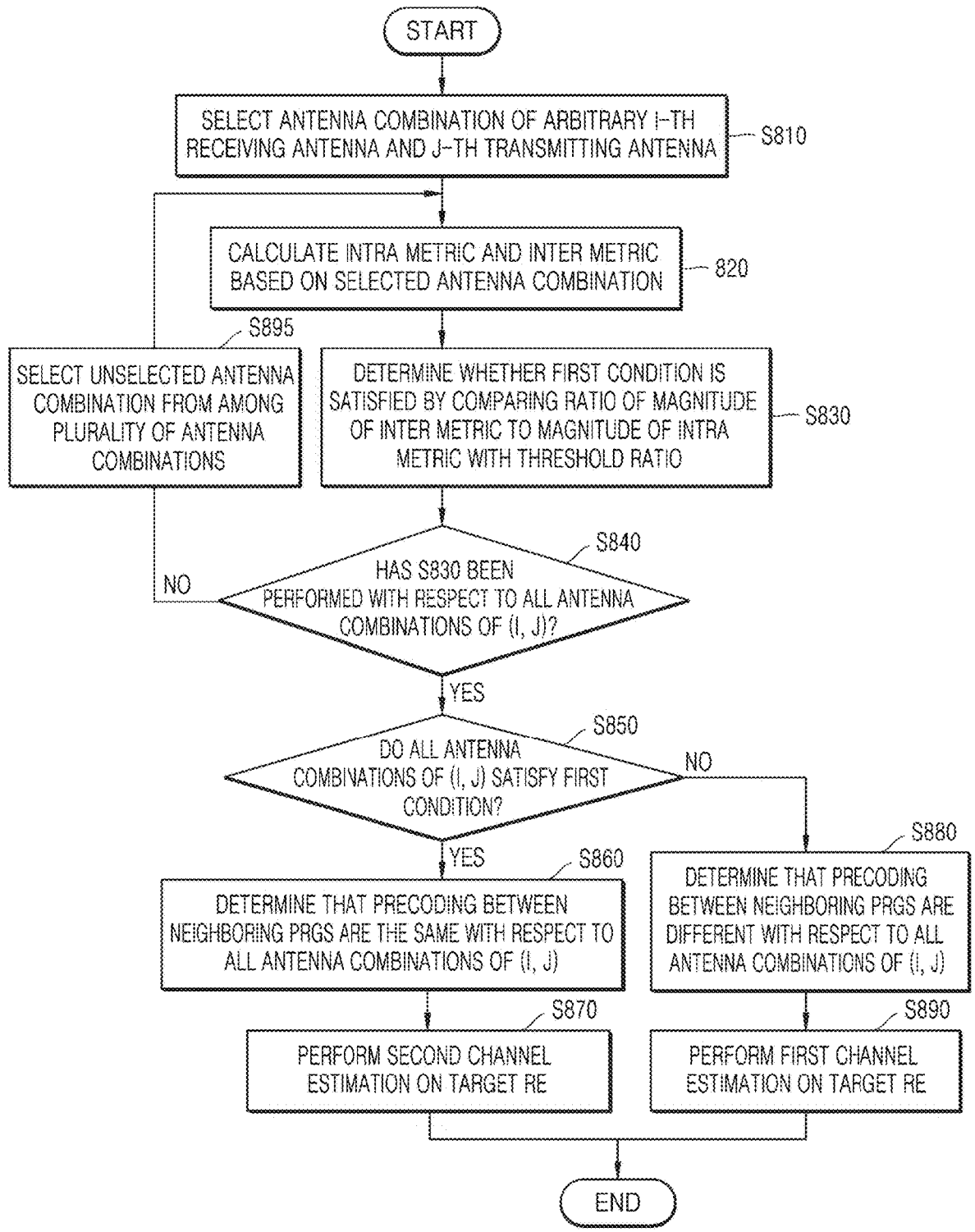
FIG. 8 is a flowchart illustrating an operating method of performing channel estimation for each antenna combination according to embodiments.

FIG. 8 is a flowchart illustrating an operating method of performing channel estimation for each antenna combination according to embodiments.

Referring to FIG. 8, in operation S810, the electronic device 120 may select an antenna combination of an arbitrary i-th receiving antenna and a j-th transmitting antenna.

For example, in the case of the MIMO system of FIG. 4, i may be 1 or 2, and j may be 1 or 2. In another example, in the case of a 4×4 MIMO system, i may be any one of 1 to 4 and j may be any one of 1 to 4. According to embodiments, the electronic device 120 may start with i=1 and j=1 in operation 810.

In operation S820, the electronic device 120 may calculate an intra metric and an inter metric based on the selected antenna combination. As described above, the metric calculation circuit 510 may calculate the intra metric with respect to the i-th receiving antenna and the j-th transmitting antenna by using Equation 1 or Equation 5. The metric calculation circuit 510 may calculate the inter metric with respect to the i-th receiving antenna and the j-th transmitting antenna by using Equation 2 or Equation 6.

In operation S830, the electronic device 120 may determine whether the first condition is satisfied by comparing a ratio of the magnitude of the inter metric to the magnitude of the intra metric with a threshold ratio. The estimation mode determination circuit 520 may compare a value, obtained by dividing the magnitude of the inter metric by the magnitude of the intra metric, with the threshold ratio. When the divided value is equal to or exceeds the threshold ratio, the estimation mode determination circuit 520 may determine that the first condition is satisfied. The estimation mode determination circuit 520 may determine that the first condition is not satisfied when the divided value is smaller than the threshold ratio.

In operation S840, the electronic device 120 may determine whether the determination of operation S830 has been performed with respect to all antenna combinations of (i, j). For example, when starting from an antenna combination of (1, 1) in operation S810, the electronic device 120 may determine whether the first condition is satisfied with respect to the antenna combination of (1, 1), and determine whether the first condition is satisfied by calculating a metric of another antenna combination (e.g., an antenna combination of (2, 1)). For example, in the case of the 4×4 MIMO system, the electronic device 120 may repeatedly select a previously unselected antenna combination in operation S895, and perform operations S820 and S830, until it is determined that the determination of operation S830 has been performed with respect to each of 16 antenna combinations.

In operation S850, the electronic device 120 may determine whether all antenna combinations satisfy the first condition. For example, in the case of the 4×4 MIMO system, the electronic device 120 may determine whether the first condition is satisfied from the antenna combination of (1, 1) to an antenna combination of (4, 4). When all antenna combinations satisfy the first condition, the electronic device 120 may perform operation S860, and when at least one antenna combination does not satisfy the first condition, perform operation S880.

In operation S860, the electronic device 120 may determine that the precoding between neighboring PRGs are the same (or similar) with respect to all antenna combinations of (i, j). That is, because it is determined in operation S850 that each of all antenna combinations satisfy the first condition, the (M)-th PRG and the (M+1)-th PRG of signals received by all receiving antennas of the electronic device 120 from all transmitting antennas of the base station 110 may be based on the same precoding (or similar precoding).

In operation S870, the electronic device 120 may perform second channel estimation (e.g., across-PRG channel estimation) on a target RE. Because the (M)-th PRG and the (M+1)-th PRG are based on the same precoding (or similar precoding), the electronic device 120 may perform channel estimation on the target RE by using channel observations of RSs included in a PRG to which the target RE belongs, as well as RSs included in adjacent PRGs and close to the target RE.

In operation S880, the electronic device 120 may determine that precoding between neighboring PRGs are different with respect to all antenna combinations of (i, j). That is, in response to determining that at least one antenna combination does not satisfy the first condition in operation S850, the electronic device 120 may estimate that precoding between neighboring PRGs are different with respect to all antenna combinations. The electronic device 120 may estimate that the (M)-th PRG and the (M+1)-th PRG of signals received by all receiving antennas of the electronic device 120 from all transmitting antennas of the base station 110 are based on different precoding.

In operation S890, the electronic device 120 may perform first channel estimation (e.g., per-PRG channel estimation) on the target RE. Because the (M)-th PRG and the (M+1)-th PRG are based on different precoding, the RSs included in adjacent PRGs and close to the target RE may be based on different precoding. Accordingly, the channel estimation circuit 530 may perform channel estimation on the target RE by using channel observations of the RSs included in the PRG to which the target RE belongs.

Figure 9:
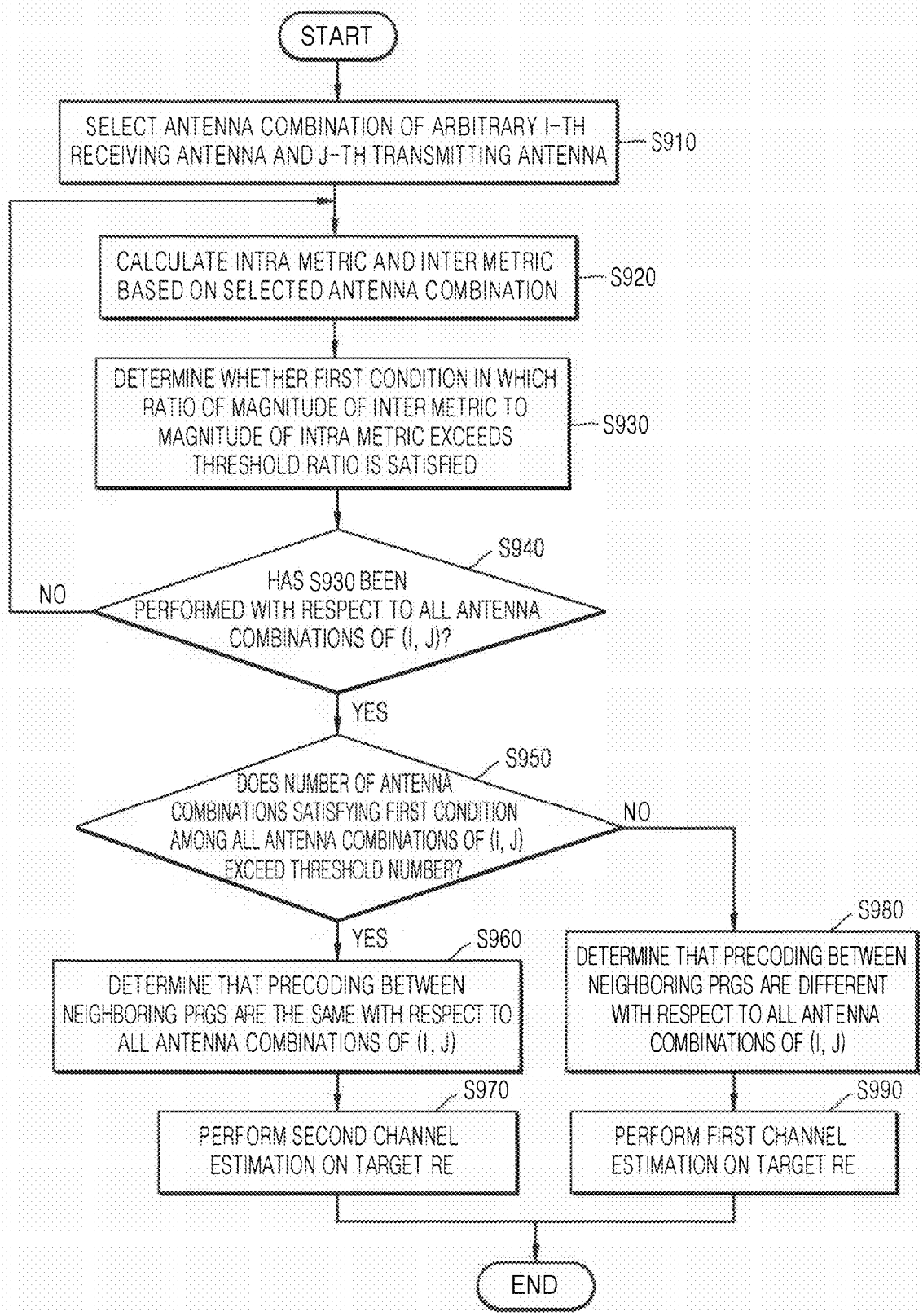
FIG. 9 is a flowchart illustrating an operating method of performing channel estimation for each antenna combination according to embodiments.

FIG. 9 is a flowchart illustrating an operating method of performing channel estimation for each antenna combination according to embodiments. Redundant descriptions with those of FIG. 8 are omitted. For example, operations S910, S920, S930, S940, S960, S970, S980 and S990 may be the same as (or similar to) operations S810, S820, S830, S840, S860, S870, S880 and S890, respectively.

Referring to FIG. 9, in operation S950, the electronic device 120 may determine whether the number of antenna combinations satisfying a first condition among all antenna combinations exceeds a threshold number. For example, in the case of the 4×4 MIMO system, the electronic device 120 may identify the number of antenna combinations satisfying the first condition among all 16 antenna combinations. When the number of antenna combinations satisfying the first condition exceeds (or is equal to) the threshold number, the electronic device 120 may treat all antenna combinations of (i, j) in the same way (or similarly) as satisfying the first condition. That is, the electronic device 120 may estimate that neighboring PRGs are based on the same precoding (or similar precoding) in all antenna combinations of (i, j).

On the other hand, when the number of antenna combinations satisfying the first condition is less than the threshold number, the electronic device 120 may treat all antenna combinations of (i, j) as not satisfying the first condition. That is, the electronic device 120 may estimate that neighboring PRGs are based on different precoding in all antenna combinations of (i, j).

Figure 10:
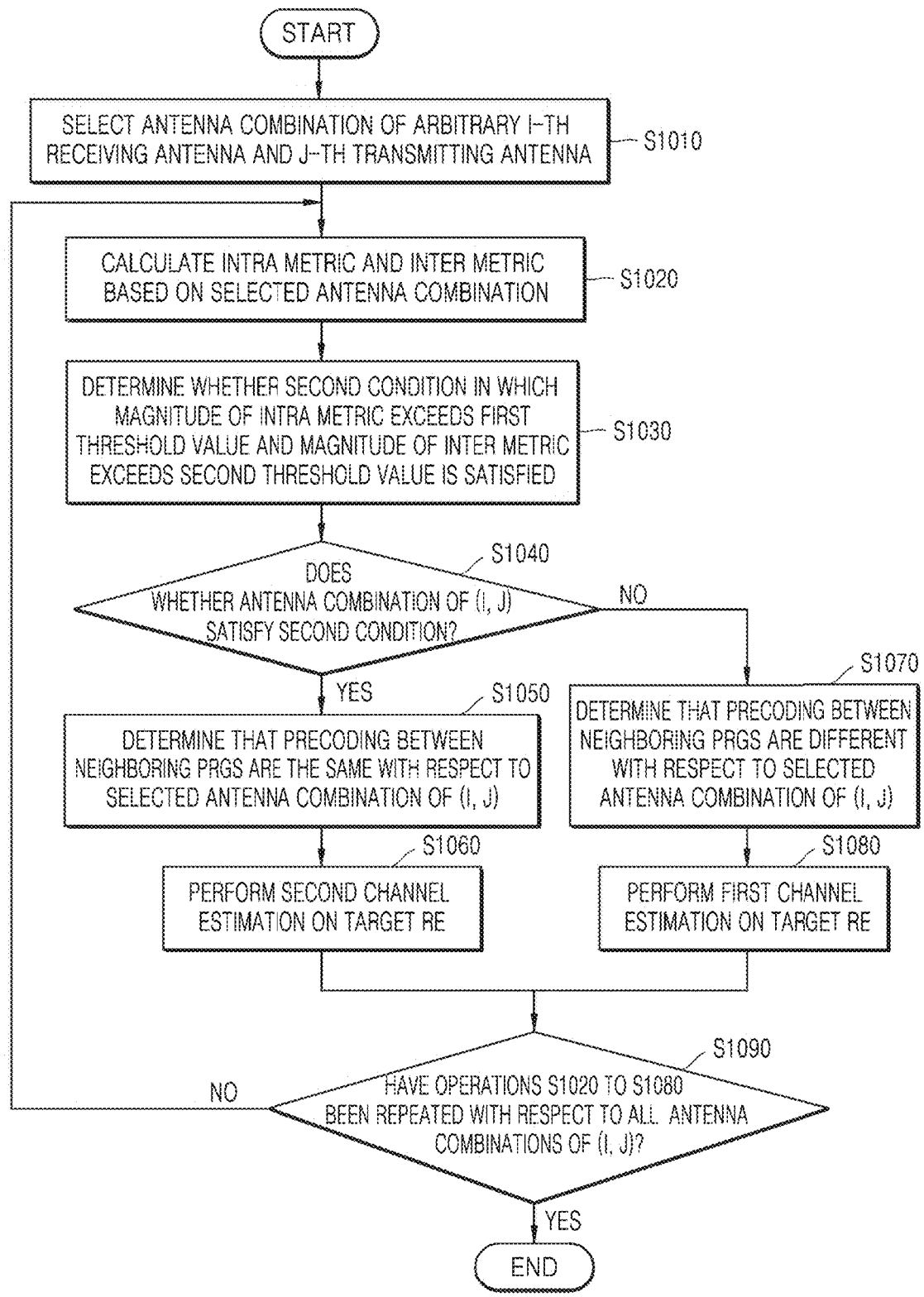
FIG. 10 is a flowchart illustrating an operating method of performing channel estimation for each antenna combination according to embodiments.

FIG. 10 is a flowchart illustrating an operating method of performing channel estimation for each antenna combination according to embodiments.

Referring to FIG. 10, in operation S1010, the electronic device 120 may select an antenna combination of an arbitrary i-th receiving antenna and a j-th transmitting antenna. For example, in the case of the MIMO system of FIG. 4, i may be 1 or 2, and j may be 1 or 2. In another example, in the case of a 4×4 MIMO system, i may be any one of 1 to 4 and j may be any one of 1 to 4. According to embodiments, the electronic device 120 may start with i=1 and j=1 in operation 1010.

In operation S1020, the electronic device 120 may calculate an intra metric and an inter metric based on the selected antenna combination. As described above, the metric calculation circuit 510 may calculate the intra metric with respect to the i-th receiving antenna and the j-th transmitting antenna by using Equation 1 or Equation 5. The metric calculation circuit 510 may calculate the inter metric with respect to the i-th receiving antenna and the j-th transmitting antenna by using Equation 2 or Equation 6.

In operation S1030, the electronic device 120 may determine whether a second condition in which both (1) the magnitude of the intra metric exceeds a first threshold value and (2) the magnitude of the inter metric exceeds a second threshold value is satisfied. For example, when the magnitude of the inter metric is less than the second threshold value even though the magnitude of the intra metric exceeds the first threshold, the second condition is not satisfied. In another example, even when the magnitude of the inter metric exceeds the second threshold value, when the magnitude of the intra metric is less than the first threshold value, the second condition is not satisfied. That is, the estimation mode determination circuit 520 may determine whether the second condition is satisfied by comparing the intra metric and the inter metric with the first and second threshold values.

In operation S1040, the electronic device 120 may determine whether the antenna combination of (i, j) satisfies the second condition and may perform operation S1050 when the second condition is satisfied. When the second condition is not satisfied, the electronic device 120 may perform operation S1070.

In operation S1050, the electronic device 120 may determine that the precoding between neighboring PRGs are the same (or similar) with respect to the selected antenna combination of (i, j). That is, because it is determined that the second condition is satisfied in operation S1040, the (M)-th PRG and the (M+1)-th PRG of a signal received by the i-th receiving antenna of the electronic device 120 from the j-th transmitting antenna of the base station 110 may be based on the same precoding (or similar precoding).

In operation S1060, the electronic device 120 may perform second channel estimation (e.g., across-PRG channel estimation) on a target RE. Because the (M)-th PRG and the (M+1)-th PRG are based on the same precoding (or similar precoding), the electronic device 120 may perform channel estimation on the target RE by using channel observations of RSs included in a PRG to which the target RE belongs, as well as RSs included in adjacent PRGs and close to the target RE In operation S1070, the electronic device 120 may determine that precoding between neighboring PRGs are different with respect to the selected antenna combination of (i, j). That is, because it is determined in operation S1040 that the second condition is not satisfied, the (M)-th PRG and the (M+1)-th PRG of the signal received by the i-th receiving antenna of the electronic device 120 from the j-th transmitting antenna of the base station 110 may be based on different precoding.

In operation S1080, the electronic device 120 may perform first channel estimation (e.g., per-PRG channel estimation) on the target RE. Because the (M)-th PRG and the (M+1)-th PRG are based on different precoding, the RSs included in adjacent PRGs and close to the target RE may be based on different precoding. Accordingly, the channel estimation circuit 530 may perform channel estimation on the target RE by using channel observations of the RSs included in the PRG to which the target RE belongs.

In operation S1090, the electronic device 120 may determine whether operations S1020 to S1080 have been repeated with respect to all antenna combinations of (i, j). The electronic device 120 may repeat operations S1020 to S1080 described above for every antenna combination of (i, j). The electronic device 120 may end the procedure when operations S1020 to S1080 have been repeated with respect to all combinations of the i-th receiving antenna and the j-th transmission antenna, and return to operation S1020 and change values of i and j and repeat operations S1030 to S1080 when operations S1020 to S1080 have not been repeated with respect to all antenna combinations of (i, j).

Figure 11:
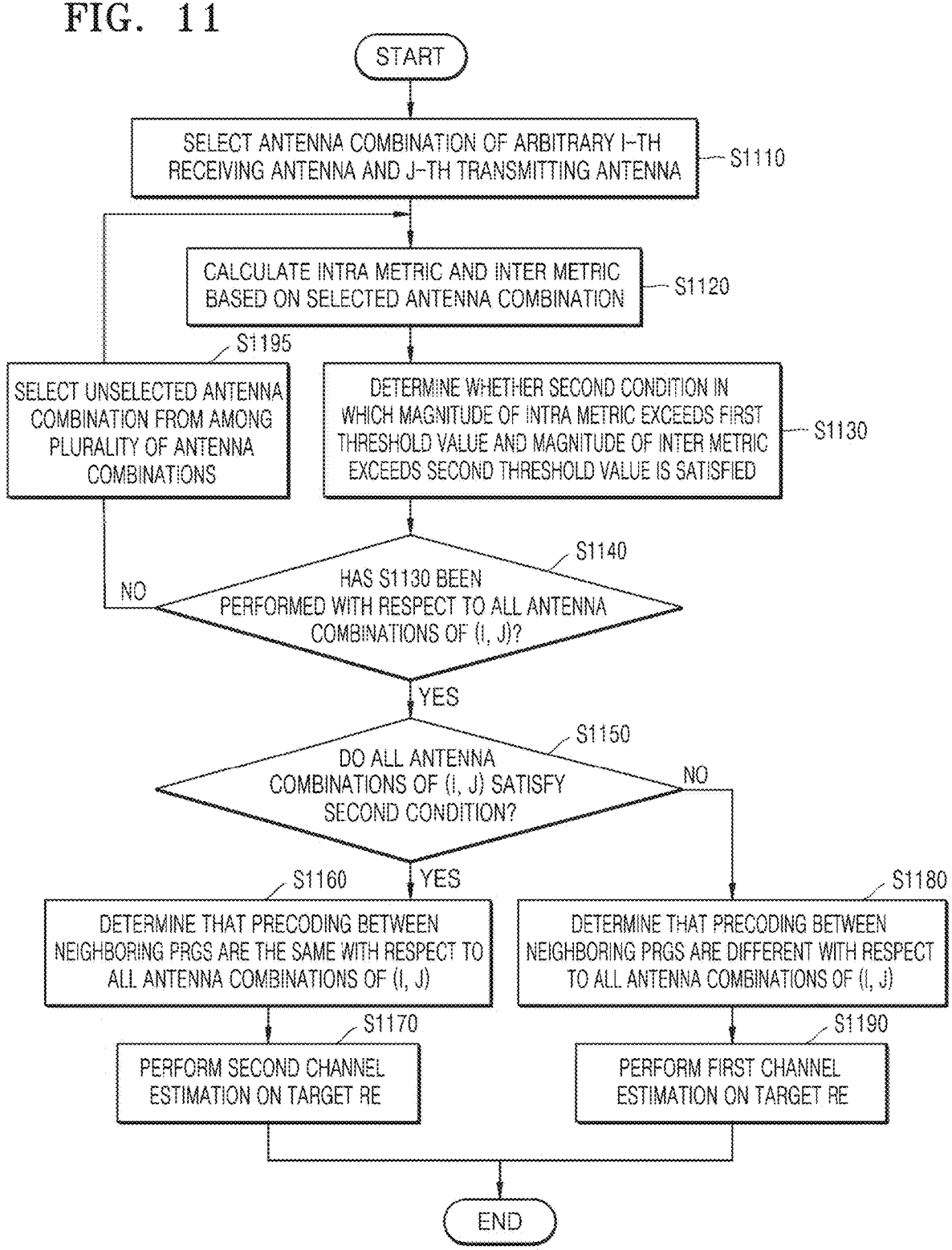
FIG. 11 is a flowchart illustrating an operating method of performing channel estimation for each antenna combination according to embodiments.

FIG. 11 is a flowchart illustrating an operating method of performing channel estimation for each antenna combination according to embodiments.

Referring to FIG. 11, in operation S1110, the electronic device 120 may select an antenna combination of an arbitrary i-th receiving antenna and a j-th transmitting antenna. For example, in the case of the MIMO system of FIG. 4, i may be 1 or 2, and j may be 1 or 2. In another example, in the case of a 4×4 MIMO system, i may be any one of 1 to 4 and j may be any one of 1 to 4. According to embodiments, the electronic device 120 may start with i=1 and j=1 in operation 1110.

In operation S1120, the electronic device 120 may calculate an intra metric and an inter metric based on the selected antenna combination. As described above, the metric calculation circuit 510 may calculate the intra metric with respect to the i-th receiving antenna and the j-th transmitting antenna by using Equation 1 or Equation 5. The metric calculation circuit 510 may calculate the inter metric with respect to the i-th receiving antenna and the j-th transmitting antenna by using Equation 2 or Equation 6.

In operation S1130, the electronic device 120 may determine whether a second condition in which both (1) the magnitude of the intra metric exceeds a first threshold value and (2) the magnitude of the inter metric exceeds a second threshold value is satisfied. The estimation mode determination circuit 520 may determine that the second condition is satisfied only when the magnitude of the intra metric exceeds the first threshold value and the magnitude of the inter metric exceeds the second threshold value. The estimation mode determination circuit 520 may determine that the second condition is not satisfied when the magnitude of the intra metric is smaller than the first threshold value or the magnitude of the inter metric is smaller than the second threshold value.

In operation S1140, the electronic device 120 may determine whether the determination of operation S1130 has been performed with respect to all antenna combinations of (i, j). For example, when starting from an antenna combination of (1, 1) in operation S1110, the electronic device 120 may determine whether the second condition is satisfied with respect to the antenna combination of (1, 1), and determine whether the second condition is satisfied by metrics of other antenna combinations (e.g., an antenna combination of (2, 1)). For example, in the case of the 4×4 MIMO system, the electronic device 120 may repeatedly select a previously unselected antenna combination in operation S1195, and perform operations S1120 and S1130, until it is determined that the determination of operation S1130 has been performed with respect to each of 16 antenna combinations.

In operation S1150, the electronic device 120 may determine whether all antenna combinations satisfy the second condition. For example, in the case of the 4×4 MIMO system, the electronic device 120 may determine whether the second condition is satisfied from the antenna combination of (1, 1) to an antenna combination of (4, 4). When all antenna combinations satisfy the second condition, the electronic device 120 may perform operation S1160, and when at least one antenna combination does not satisfy the second condition, perform operation S1180.

In operation S1160, the electronic device 120 may determine that the precoding between neighboring PRGs are the same (or similar) with respect to all antenna combinations of (i, j). That is, because it is determined in operation S1150 that each of all antenna combinations satisfies the second condition, the (M)-th PRG and the (M+1)-th PRG of signals received by all receiving antennas of the electronic device 120 from all transmitting antennas of the base station 110 may be based on the same precoding (or similar precoding).

In operation S1170, the electronic device 120 may perform second channel estimation (e.g., across-PRG channel estimation) on a target RE. Because the (M)-th PRG and the (M+1)-th PRG are based on the same precoding (or similar precoding), the electronic device 120 may perform channel estimation on the target RE by using channel observations of RSs included in a PRG to which the target RE belongs, as well as RSs included in adjacent PRGs and close to the target RE.

In operation S1180, the electronic device 120 may determine that precoding between neighboring PRGs are different with respect to all antenna combinations of (i, j). That is, in response to determining that at least one antenna combination does not satisfy the second condition in operation S1150, the electronic device 120 may estimate that precoding between neighboring PRGs are different with respect to all antenna combinations. The electronic device 120 may estimate that the (M)-th PRG and the (M+1)-th PRG of signals received from all transmission antennas of the base station 110 to all reception antennas of the electronic device 120 are based on different precoding.

In operation S1190, the electronic device 120 may perform per-PRG channel estimation on the target RE. Because the (M)-th PRG and the (M+1)-th PRG are based on different precoding, the RSs included in adjacent PRGs and close to the target RE may be based on different precoding. Accordingly, the channel estimation circuit 530 may perform channel estimation (e.g., first channel estimation) on the target RE by using channel observations of the RSs included in the PRG to which the target RE belongs.

Figure 12:
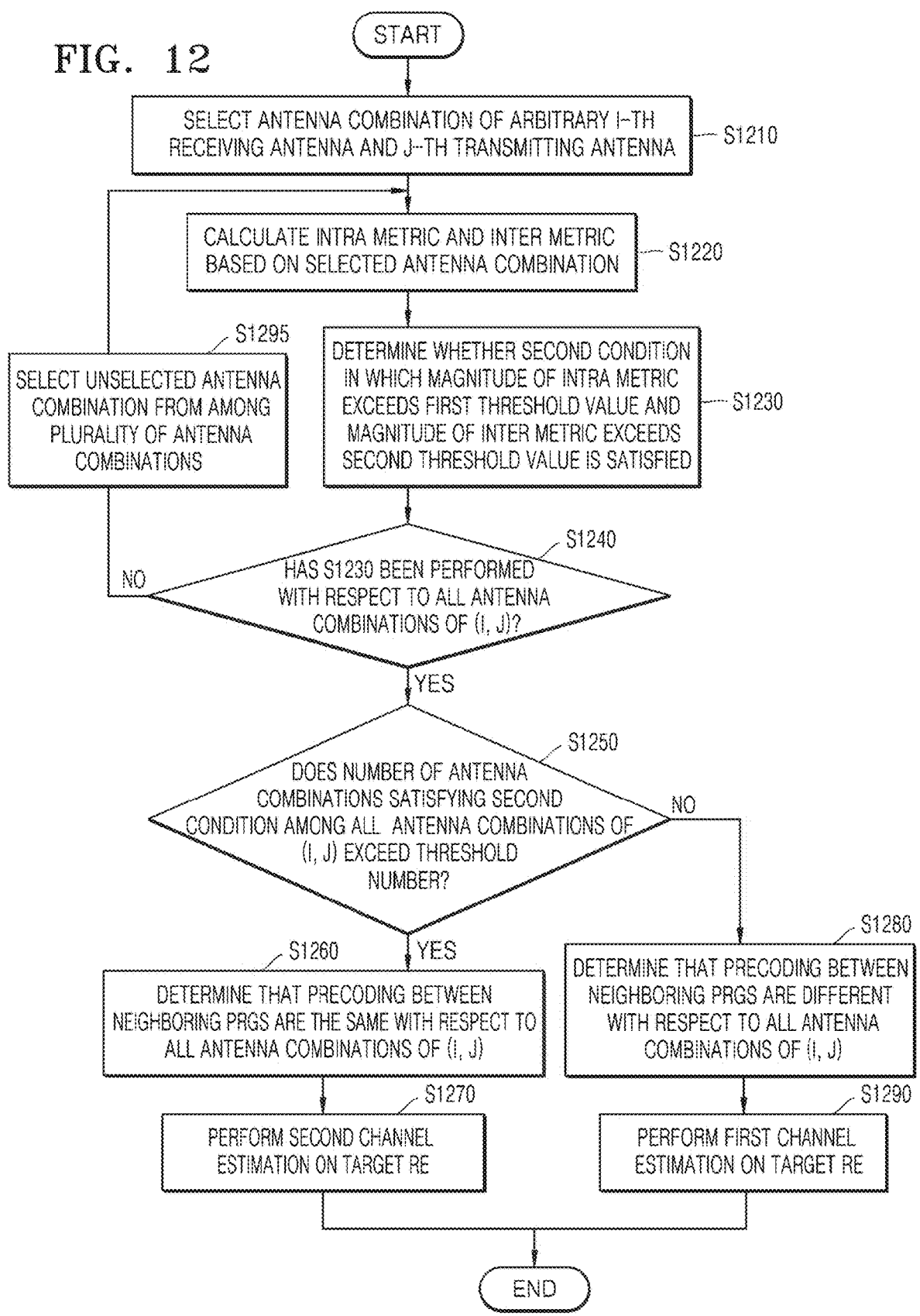
FIG. 12 is a flowchart illustrating an operating method of performing channel estimation for each antenna combination according to embodiments.

FIG. 12 is a flowchart illustrating an operating method of performing channel estimation for each antenna combination according to embodiments. Redundant descriptions with those of FIG. 11 are omitted. For example, operations S1210, S1220, S1230, S1240, S1260, S1270, S1280, S1290 and S1295 may be the same as (or similar to) operations S1110, S1120, S1130, S1140, S1160, S1170, S1180, S1190 and S1195, respectively.

Referring to FIG. 12, in operation S1250, the electronic device 120 may determine whether the number of antenna combinations satisfying the second condition among all antenna combinations of (i, j) exceeds a threshold number. For example, in the case of a 4×4 MIMO system, the electronic device 120 may identify the number of antenna combinations satisfying the second condition among all 16 antenna combinations. When the number of antenna combinations satisfying the second condition exceeds (or is equal to) the threshold number, the electronic device 120 may treat all antenna combinations of (i, j) in the same way (or similarly) as satisfying the second condition. That is, the electronic device 120 may estimate that neighboring PRGs are based on the same precoding (or similar precoding) in all antenna combinations of (i, j). On the other hand, when the number of antenna combinations satisfying the second condition is less than the threshold number, the electronic device 120 may treat all antenna combinations of (i, j) as not satisfying the second condition. That is, the electronic device 120 may estimate that neighboring PRGs are based on different precoding in all antenna combinations of (i, j).

Figure 13:
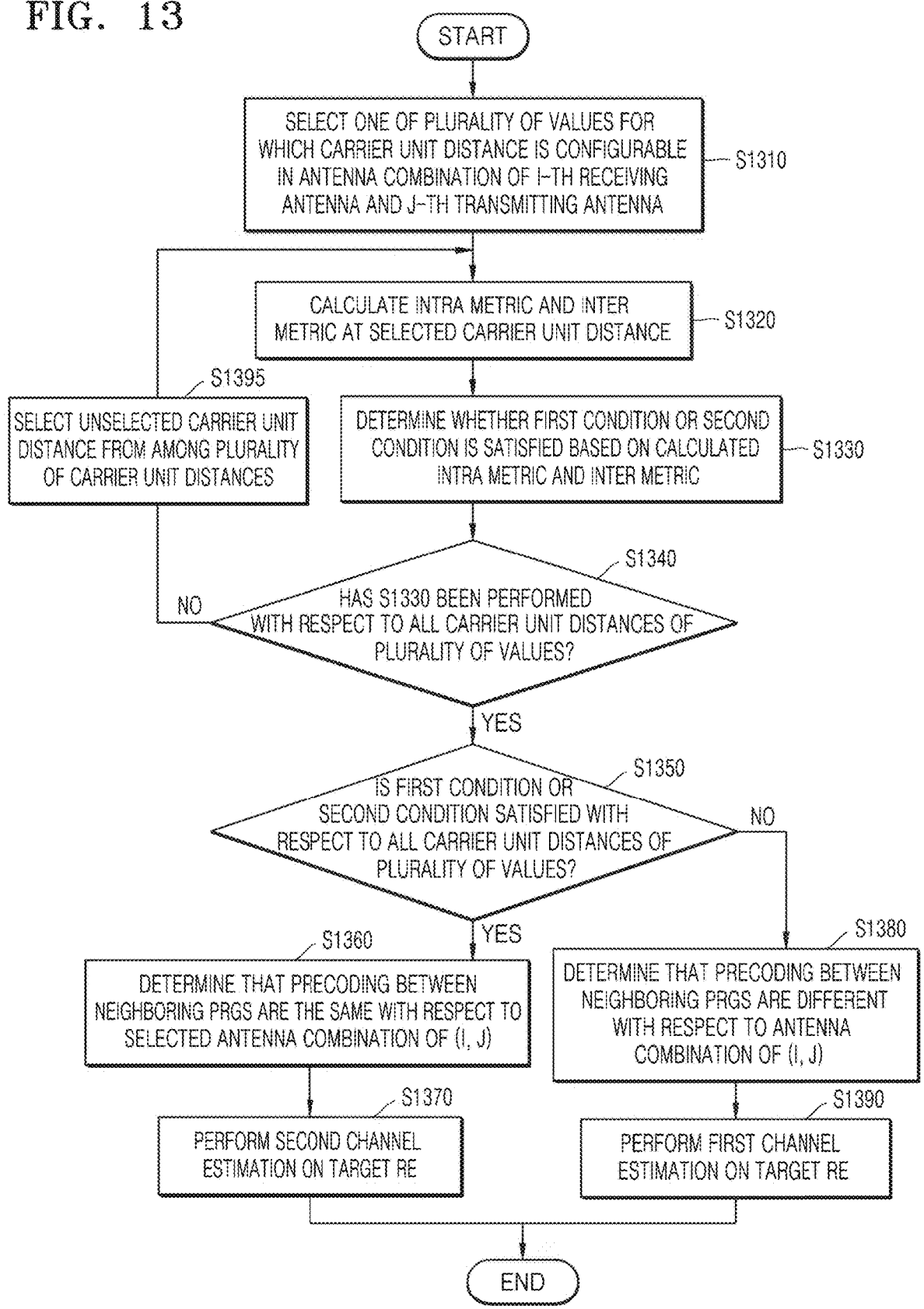
FIG. 13 is a flowchart illustrating an operating method of performing channel estimation for each carrier unit distance according to embodiments.

FIG. 13 is a flowchart illustrating an operating method of performing channel estimation for each carrier unit distance according to embodiments.

Referring to FIG. 13, in operation S1310, the electronic device 120 may select a carrier unit distance from among a plurality of values which are configurable in an antenna combination of an i-th receiving antenna and a j-th transmitting antenna. For example, in the case of the MIMO system of FIG. 4, i may be 1 or 2, and j may be 1 or 2. In another example, in the case of a 4×4 MIMO system, i may be any one of 1 to 4 and j may be any one of 1 to 4. The carrier unit distance may be any one of a plurality of values configurable in 3GPP NR. For example, the electronic device 120 may select the carrier unit distance from a smallest value among the plurality of values.

In operation S1320, the electronic device 120 may calculate an intra metric and an inter metric at the selected carrier unit distance. As described above, the metric calculation circuit 510 may calculate the intra metric by using Equation 1 or Equation 4 when the carrier unit distance is the selected any one value with respect to the antenna combination. The metric calculation circuit 510 may calculate the inter metric by using Equation 2 or Equation 6 when the carrier unit distance is selected any one value with respect to the antenna combination.

In operation S1330, the electronic device 120 may determine whether a first condition or a second condition is satisfied based on the calculated intra metric and inter metric. For example, the electronic device 120 may determine whether the first condition is satisfied based on the calculated intra metric and inter metric. At this time, the first condition may be determined according to Equation 3 or Equation 7. In another example, the electronic device 120 may determine whether the second condition is satisfied based on the calculated intra metric and inter metric. At this time, the first condition may be determined according to Equation 4 or Equation 8.

In operation S1340, the electronic device 120 may determine whether the determination of operation S1330 has been performed with respect to all carrier unit distances of the plurality of values. For example, the electronic device 120 may determine whether the first condition or the second condition is satisfied with respect to each of the plurality of values other than the smallest value. The electronic device 120 may repeatedly select a previously unselected carrier unit distance in operation S1395 (e.g., select a next smallest carrier unit distance), and perform operations S1320 and S1330, until it is determined that the determination of operation S1330 has been performed with respect to all carrier unit distances of the plurality of values. For example, the electronic device 120 may determine that operation S1330 has been performed with respect to all carrier unit distances when the carrier unit distance reaches a largest value among the plurality of values.

In operation S1350, the electronic device 120 may determine whether the first condition or the second condition is satisfied with respect to all carrier unit distances. For example, the electronic device 120 may determine whether the first condition or the second condition is satisfied from the smallest value to the largest value for which the carrier unit distance is configurable. When the first condition or the second condition is satisfied with respect to all carrier unit distances, the electronic device 120 may operation S1360, and when the first condition or the second condition is not satisfied with respect to at least one carrier unit distance, perform operation S1380.

In operation S1360, the electronic device 120 may determine that precoding between neighboring PRGs are the same (or similar) with respect to the antenna combination of (i, j). That is, because it is determined in operation S1350 that the first condition or the second condition is satisfied with respect to all carrier unit distances, the electronic device 120 may determine that the (M)-th PRG and the (M+1)-th PRG of a signal received by a j-th receiving antenna of the electronic device 120 from an i-th transmitting antenna of the base station 110 are based on the same precoding (or similar precoding).

In operation S1370, the electronic device 120 may perform second channel estimation (e.g., across-PRG channel estimation) on a target RE. Because the (M)-th PRG and the (M+1)-th PRG are based on the same precoding (or similar precoding), the electronic device 120 may perform channel estimation on the target RE by using channel observations of RSs included in a PRG to which the target RE belongs, as well as RSs included in adjacent PRGs and close to the target RE.

In operation S1380, the electronic device 120 may determine that precoding between neighboring PRGs are different with respect to the antenna combination of (i, j). That is, because it is determined in operation S1350 that the first condition or the second condition is not satisfied with respect to at least one carrier unit distance, the electronic device 120 may determine that the (M)-th PRG and the (M+1)-th PRG of the signal received by the j-th receiving antenna of the electronic device 120 from the i-th antenna of the base station 110 are based on different precoding.

In operation S1390, the electronic device 120 may perform first channel estimation (e.g., per-PRG channel estimation) on the target RE. Because the (M)-th PRG and the (M+1)-th PRG are based on different precoding, the RSs included in adjacent PRGs and close to the target RE may be based on different precoding. Accordingly, the channel estimation circuit 530 may perform channel estimation on the target RE by using channel observations of the RSs included in the PRG to which the target RE belongs.

Figure 14:
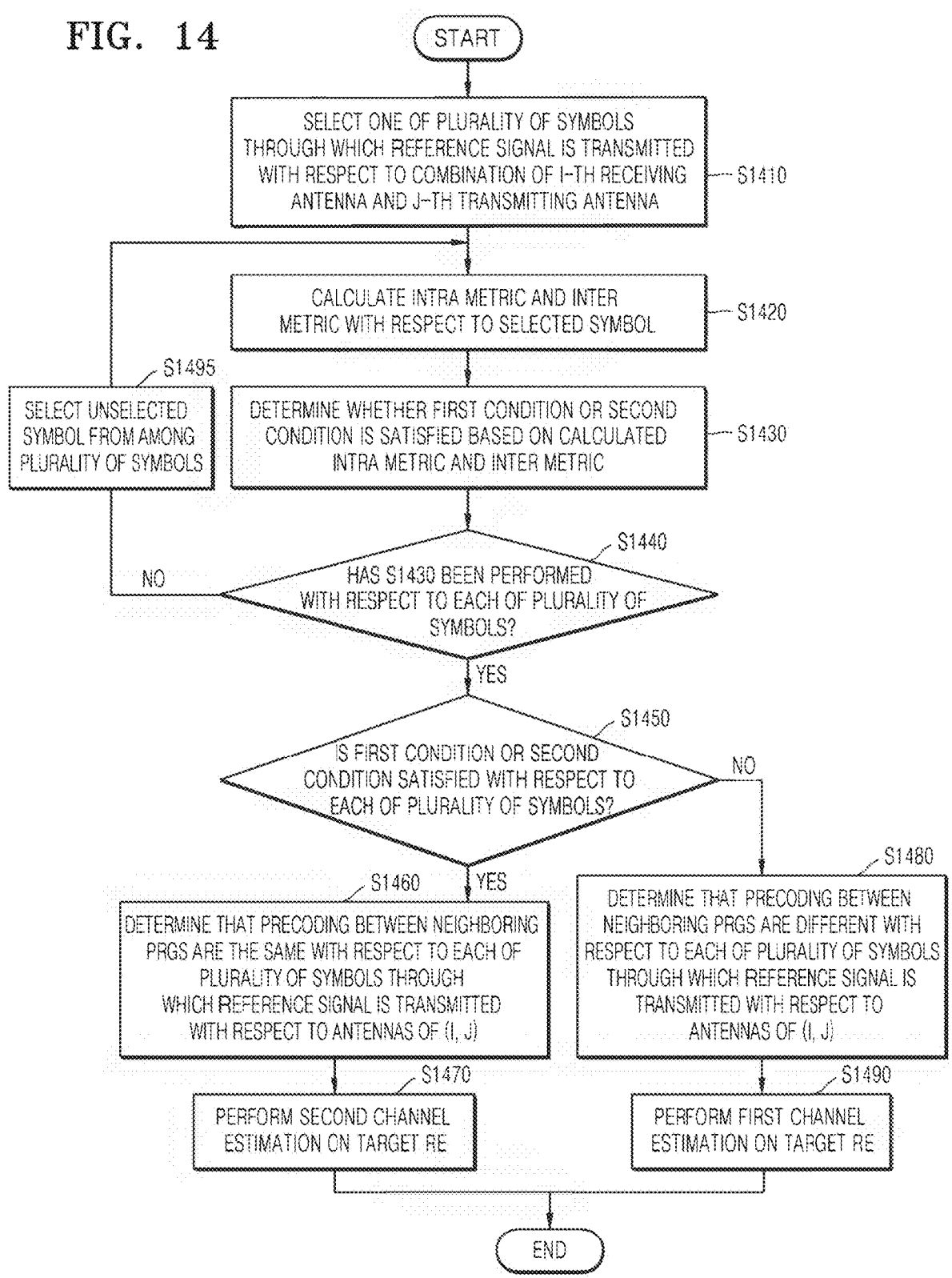
FIG. 14 is a flowchart illustrating an operating method of performing channel estimation for each symbol according to embodiments.

FIG. 14 is a flowchart illustrating an operating method of performing channel estimation for each symbol according to embodiments.

In the above-described examples, in FIGS. 7 to 12, it is determined whether precoding between adjacent PRGs are the same (or similar) according to an antenna combination for each symbol when a carrier unit distance is a fixed value, and in FIG. 13, it is determined whether precoding between adjacent PRGs are the same (or similar) according to a carrier unit distance for each symbol when an antenna combination is a fixed value, but embodiments are not limited thereto. According to embodiments, when a reference signal is transmitted through a plurality of symbols, the electronic device 120 may perform channel estimation for each combination of a symbol and a carrier unit distance between RSs used when calculating an intra metric and an inter metric.

Referring to FIG. 14, in operation S1410, the electronic device 120 may select one of the plurality of symbols through which a reference signal is transmitted with respect to a combination of an i-th receiving antenna and a j-th transmitting antenna. For example, there are two 3GPP NR PDSCH DMRS symbols, and the two OFDM symbol indices l may be 2 and 11, respectively.

In operation S1420, the electronic device 120 may calculate the intra metric and the inter metric with respect to the selected symbol. As described above, the metric calculation circuit 510 may calculate the intra metric by using Equation 1 or Equation 4 when a symbol is determined with respect to the antenna combination. For example, the metric calculation circuit 510 may calculate the intra metric when the OFDM symbol index l is 2. The metric calculation circuit 510 may calculate the inter metric by using Equation 2 or Equation 6 when the symbol is determined with respect to the antenna combination. For example, the metric calculation circuit 510 may calculate the inter metric when the OFDM symbol index l is 2.

In operation S1430, the electronic device 120 may determine whether a first condition or a second condition is satisfied based on the intra metric or the inter metric calculated with respect to the selected symbol. For example, the electronic device 120 may determine whether the first condition is satisfied based on the calculated intra metric and inter metric. At this time, the first condition may be determined according to Equation 3 or Equation 7. In another example, the electronic device 120 may determine whether the second condition is satisfied based on the calculated intra metric and inter metric. At this time, the second condition may be determined according to Equation 4 or Equation 8.

In operation S1440, the electronic device 120 may determine whether the determination of operation S1430 has been performed with respect to each of the plurality of symbols. For example, when the symbol indices l of the 3GPP NR PDSCH DMRS symbols are 2 and 11, respectively, because the electronic device 120 calculates only the intra metric and the inter metric when the symbol index l is 2, the electronic device 120 may select a previously unselected symbol (e.g., select the symbol index l to be 11) in operation S1495, return to operation S1420, and calculate the intra metric and the inter metric when the symbol index l is 11.

In operation S1450, the electronic device 120 may determine whether the first condition or the second condition is satisfied for each of the plurality of symbols. For example, the electronic device 120 may determine whether the first condition or the second condition is satisfied based on the inter metric and the intra metric when the symbol index l is 2, and determine whether the first condition or the second condition is satisfied based on the inter metric and the intra metric when the symbol index l is 11. When the first condition or the second condition is satisfied with respect to all symbols, the electronic device 120 may operation S1460, and when the first condition or the second condition is not satisfied with respect to at least one symbol, the electronic device 120 may operation S1480.

In operation S1460, the electronic device 120 may determine that precoding between neighboring PRGs are the same (or similar) with respect to each of the plurality of symbols through which the reference signal is transmitted and the antennas of (i, j). That is, because it is determined in operation S1450 that the first condition or the second condition is satisfied with respect to each of the plurality of symbols, the electronic device 120 may determine that the (M)-th PRG and the (M+1)-th PRG are based on the same precoding (or similar precoding) on all symbols of a reference signal received by a j-th receiving antenna of the electronic device 120 from an i-th transmitting antenna of the base station 110.

In operation S1470, the electronic device 120 may perform second channel estimation (e.g., across-PRG channel estimation) on a target RE. Because the (M)-th PRG and the (M+1)-th PRG are based on the same precoding (or similar precoding), the electronic device 120 may perform channel estimation on the target RE by using channel observations of RSs included in a PRG to which the target RE belongs, as well as RSs included in adjacent PRGs and close to the target RE.

In operation S1480, the electronic device 120 may determine that precoding between neighboring PRGs are different with respect to the each of the plurality of symbols through which the reference signal is transmitted and the antennas of (i, j). That is, because it is determined in operation S1450 that the first condition or the second condition is not satisfied with respect to at least one of the plurality of symbols, the electronic device 120 may determine that the (M)-th PRG and the (M+1)-th PRG are based on different precoding with respect to all symbols of the reference signal received by the j-th receiving antenna of the electronic device 120 from the i-th antenna of the base station 110.

In operation S1490, the electronic device 120 may perform first channel estimation (e.g., per-PRG channel estimation) on the target RE. Because the (M)-th PRG and the (M+1)-th PRG are based on different precoding, the RSs included in adjacent PRGs and close to the target RE may be based on different precoding. Accordingly, the channel estimation circuit 530 may perform channel estimation on the target RE by using channel observations of the RSs included in the PRG to which the target RE belongs.

Figure 15A:
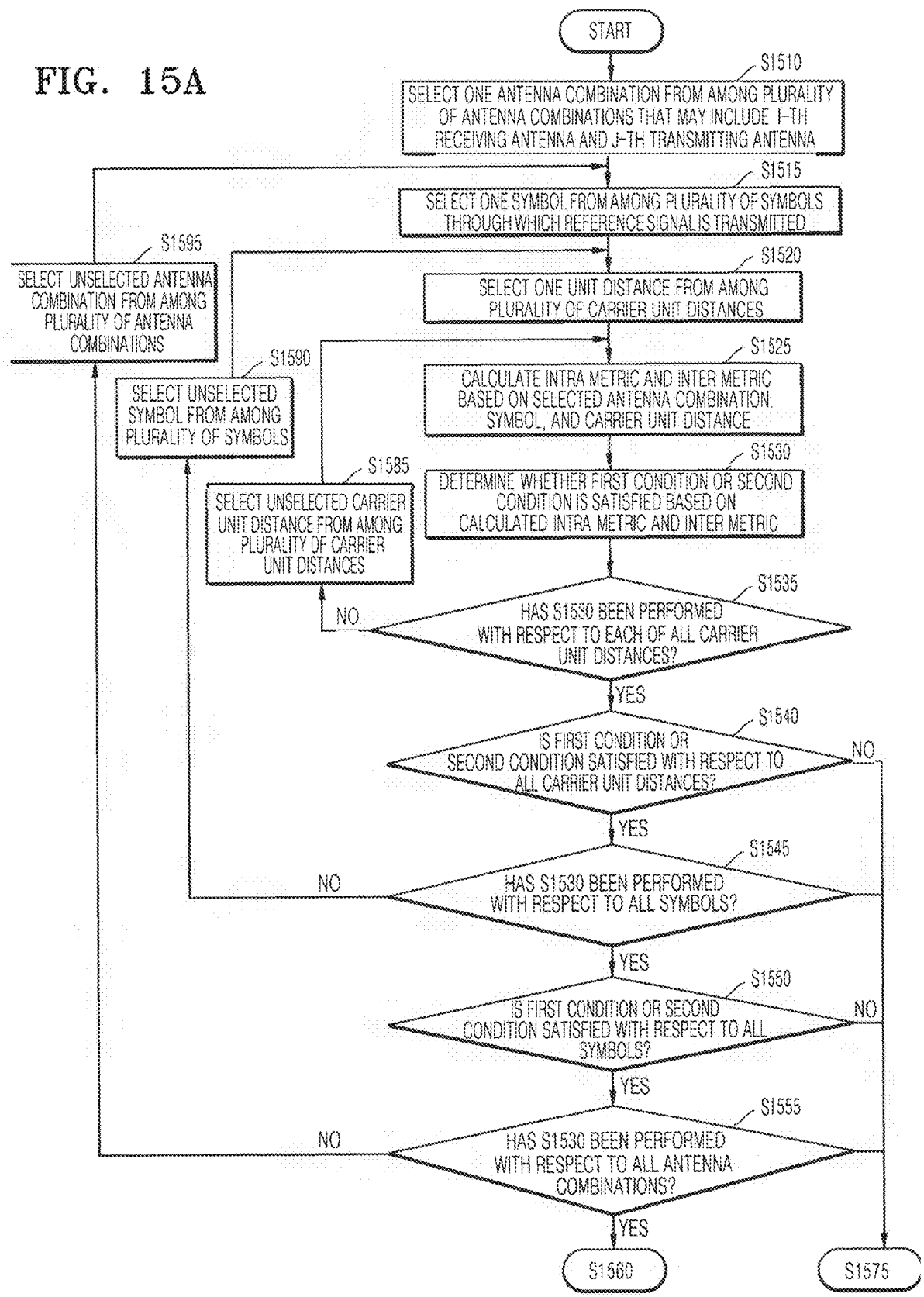
FIG. 15A is a flowchart illustrating an operating method of performing channel estimation for each antenna combination, carrier unit distance and symbol according to embodiments.
Figure 15B:
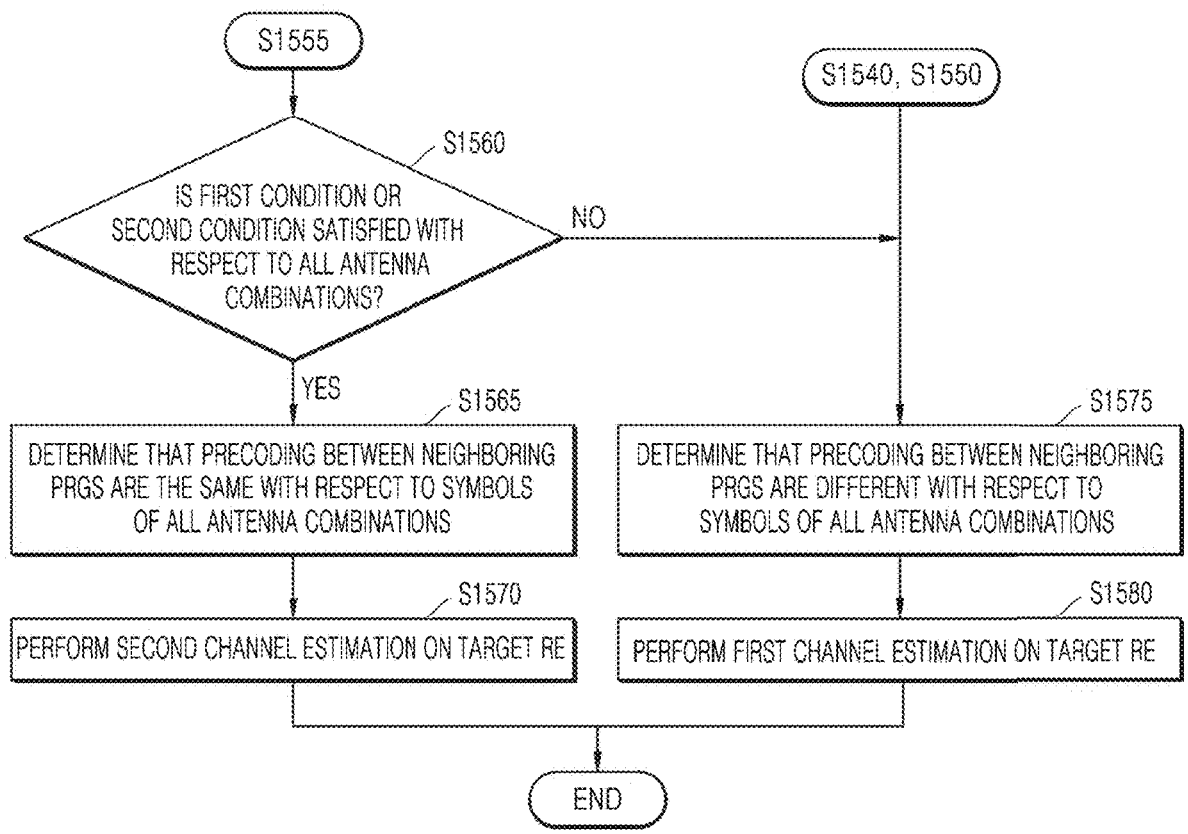
FIG. 15B is a flowchart illustrating an operating method of performing channel estimation for each antenna combination, carrier unit distance and symbol according to embodiments.

FIGS. 15A and 15B are flowcharts illustrating an operating method of performing channel estimation for each antenna combination, carrier unit distance and symbol according to embodiments.

Referring to FIG. 15A, in operation S1510, the electronic device 120 may select one antenna combination from among a plurality of antenna combinations that may include an i-th receiving antenna and a j-th transmitting antenna. For example, in the case of the MIMO system of FIG. 4, i may be 1 or 2, j may be 1 or 2, and the number of antenna combinations in this case may be 4. In another example, in the case of a 4×4 MIMO system, i may be any one of 1 to 4, j may be any one of 1 to 4, and the number of the plurality of antenna combinations in this case may be 16. The electronic device 120 may select one antenna combination from among a plurality of antenna combinations. For example, the electronic device 120 may select an antenna combination of i=1 and j=1 in operation S1510.

In operation S1515, the electronic device 120 may select one symbol from among a plurality of symbols through which a reference signal is transmitted. For example, with respect to the antenna combination of the i-th receiving antenna and the j-th transmitting antenna selected in operation S1510, the reference signal may be transmitted through symbols having 2 and 11 as the OFDM symbol index l. The electronic device 120 may select any one symbol from the symbol index l of 2 or 11. For example, the electronic device 120 may select a symbol having the symbol index of 2.

In operation S1520, the electronic device 120 may select one unit distance from among a plurality of carrier unit distances. The carrier unit distance Δ may be variably configurable, and for example, may be any one of values 2 and/or 4. For example, in operation S1520, the electronic device 120 may select the value 2 of the carrier unit distance Δ from among the values 2 and 4 of the carrier unit distance Δ.

In operation S1525, the electronic device 120 may calculate an intra metric and an inter metric based on the selected antenna combination, symbol, and carrier unit distance Δ. For example, the metric calculation circuit 510 may calculate the intra metric by using Equation 1 or Equation 5, and calculate the inter metric by using Equation 2 or Equation 6, when the carrier unit distance Δ is 2 with respect to a reference signal received at the symbol index of 2 through a first receiving antenna and a first transmitting antenna.

In operation S1530, the electronic device 120 may determine whether a first condition or a second condition is satisfied based on the calculated intra metric and inter metric. For example, the electronic device 120 may determine whether the first condition is satisfied based on the calculated intra metric and inter metric. At this time, the first condition may be determined according to Equation 3 or Equation 7. In another example, the electronic device 120 may determine whether the second condition is satisfied based on the calculated intra metric and inter metric. At this time, the second condition may be determined according to Equation 4 or Equation 8.

In operation S1535, the electronic device 120 may determine whether the determination of operation S1530 has been performed with respect to each of all carrier unit distances. That is, the electronic device 120 may determine whether the first condition or the second condition is satisfied for each carrier unit distance in a combination of the i-th receiving antenna and the j-th transmitting antenna and the symbol index 1. For example, the electronic device 120 may select a first receiving antenna and a first transmitting antenna in operation S1510, select a symbol index of 2 in operation S1515, and select a carrier unit distance of 2 in operation S1520. Because the electronic device 120 has not performed the determination of operation S1530 when the carrier unit distance is 4, the electronic device 120 may select an unselected carrier unit distance (e.g., the carrier unit distance is 4) from among a plurality of carrier unit distances (e.g., the carrier unit distance is 2 and 4) in operation S1585, and repeat operations S1525 and S1530. When the metric calculation and condition comparison of all carrier unit distances with respect to the antenna combination selected in operation S1510 and the symbol selected in operation S1515 are completed, the electronic device 120 may perform operation S1540.

In operation S1540, the electronic device 120 may determine whether the first condition or the second condition is satisfied with respect to all carrier unit distances. For example, a metric with respect to each of the plurality of carrier unit distances may satisfy the first condition or the second condition. In this case, the electronic device 120 may proceed to operation S1545. In another example, a metric with respect to at least one of the plurality of carrier unit distances may not satisfy the first condition and the second condition. The electronic device 120 may proceed to operation S1575 and determine that precoding between neighboring PRGs are different with respect to all symbols of all antenna combinations (or at least one symbol of at least one antenna combination).

In operation S1545, the electronic device 120 may determine whether the determination of operation S1530 has been performed with respect to all symbols. For example, in operation S1515, the electronic device 120 may have selected the symbol index of 2. The electronic device 120 may calculate metrics with respect to all carrier unit distances when the symbol index is 2 by repeating operations S1525 and S1530. However, when the symbol index is 11, because the metrics have not been calculated, the electronic device 120 may select a previously unselected symbol among the plurality of symbols in operation S1590. According to the foregoing example, the electronic device 120 may select an unselected symbol index of 11 from among the symbol indices of 2 and 11. The electronic device 120 may select the unselected symbol and perform operations S1520 to S1545 again. For example, the electronic device 120 may calculate metrics when the carrier unit distance is 2 and 4 with respect to the symbol index of 11, and complete metric calculation and condition comparison when the condition is satisfied and when the carrier unit distance is 4. Thereafter, the electronic device 120 may proceed to operation S1550 when it is determined whether the first condition or the second condition is satisfied with respect to all symbols.

In operation S1550, the electronic device 120 may determine whether the first condition or the second condition is satisfied with respect to all symbols. When it is determined that all symbols satisfy the first condition or the second condition, the electronic device 120 may proceed to operation S1555. For example, metrics of all carrier unit distances when the symbol index is 2 (e.g., carrier unit distances of 2 and 4) may satisfy the first condition or the second condition, and metrics of all carrier unit distances when the symbol index is 11 (e.g., carrier unit distances of 2 and 4) may satisfy the first condition or the second condition. In another example, when the symbol index is 2, the metric of at least one carrier unit distance does not satisfy the first condition and the second condition, or when the symbol index is 11, the metric of at least one carrier unit distance may not satisfy the first condition and the second condition. Accordingly, the electronic device 120 may proceed to operation S1575 and determine that precoding between neighboring PRGs are different with respect to all symbols of all antenna combinations (or at least one symbol of at least one antenna combination).

In operation S1555, the electronic device 120 may determine whether the determination of operation S1530 has been performed with respect to all antenna combinations. For example, in operation S1510, the electronic device 120 may select an antenna combination of the first receiving antenna and the first transmitting antenna. The electronic device 120 may determine whether the determination of operation S1530 has been performed with respect to all carrier unit distances for each of a plurality of symbols with respect to the selected antenna combination. However, because the electronic device 120 has not determined whether the metrics with respect to all carrier unit distances satisfy the first condition or the second condition for each of a plurality of symbols with respect to the remaining antenna combinations, the electronic device 120 may select an unselected antenna combination from among the plurality of antenna combinations. According to the 4×4 MIMO example described above, the electronic device 120 may iteratively select a previously unselected antenna combination in operation S1585, and perform operations S1510 to S1550 with respect to 15 unselected antenna combinations. Thereafter, the electronic device 120 may proceed to operation S1560 when it is determined that the determination of operation S1530 has been performed for all antenna combinations.

In operation S1560, the electronic device 120 may determine whether the first condition or the second condition is satisfied with respect to all antenna combinations. When it is determined that all antenna combinations satisfy the first condition or the second condition, the electronic device 120 may proceed to operation S1565. For example, for each of the 16 antenna combinations, metrics of all carrier unit distances when the symbol index is 2 (e.g., carrier unit distances of 2 and 4) may satisfy the first condition or the second condition, and metrics of all carrier unit distances when the symbol index is 11 (e.g., carrier unit distances of 2 and 4) may satisfy the first condition or the second condition. In another example, there may be at least one antenna combination in which when the symbol index is 2, the metric of at least one carrier unit distance does not satisfy the first condition and the second condition, or when the symbol index is 11, the metric of at least one carrier unit distance does not satisfy the first condition and the second condition. Accordingly, the electronic device 120 may proceed to operation S1575 and determine that precoding between neighboring PRGs are different with respect to all symbols of all antenna combinations (or at least one symbol of at least one antenna combination).

In operation S1565, the electronic device 120 may determine that precoding between neighboring PRGs are the same (or similar) with respect to all symbols of all antenna combinations. That is, because it is determined in operation S1560 that the first condition or the second condition is satisfied with respect to all antenna combinations, the electronic device 120 may determine that the (M)-th PRG and the (M+1)-th PRG are based on the same precoding (or similar precoding) on all symbols of a reference signal received by all antenna combinations.

In operation S1570, the electronic device 120 may perform second channel estimation (e.g., across-PRG channel estimation) on a target RE. Because the (M)-th PRG and the (M+1)-th PRG are based on the same precoding (or similar precoding), the electronic device 120 may perform channel estimation on the target RE by using channel observations of RSs included in a PRG to which the target RE belongs, as well as RSs included in adjacent PRGs and close to the target RE In operation S1580, the electronic device 120 may perform first channel estimation (e.g., per-PRG channel estimation) on the target RE. Because the (M)-th PRG and the (M+1)-th PRG are based on different precoding, the RSs included in adjacent PRGs and close to the target RE may be based on different precoding. Accordingly, the channel estimation circuit 530 may perform channel estimation on the target RE by using channel observations of the RSs included in the PRG to which the target RE belongs. That is, in the above-described example, the electronic device 120 may consider that precoding between neighboring PRGs are the same (or similar) only when the metrics with respect to all carrier unit distances satisfy the first condition or the second condition with respect to all symbols of all antenna combinations.

Figure 16:
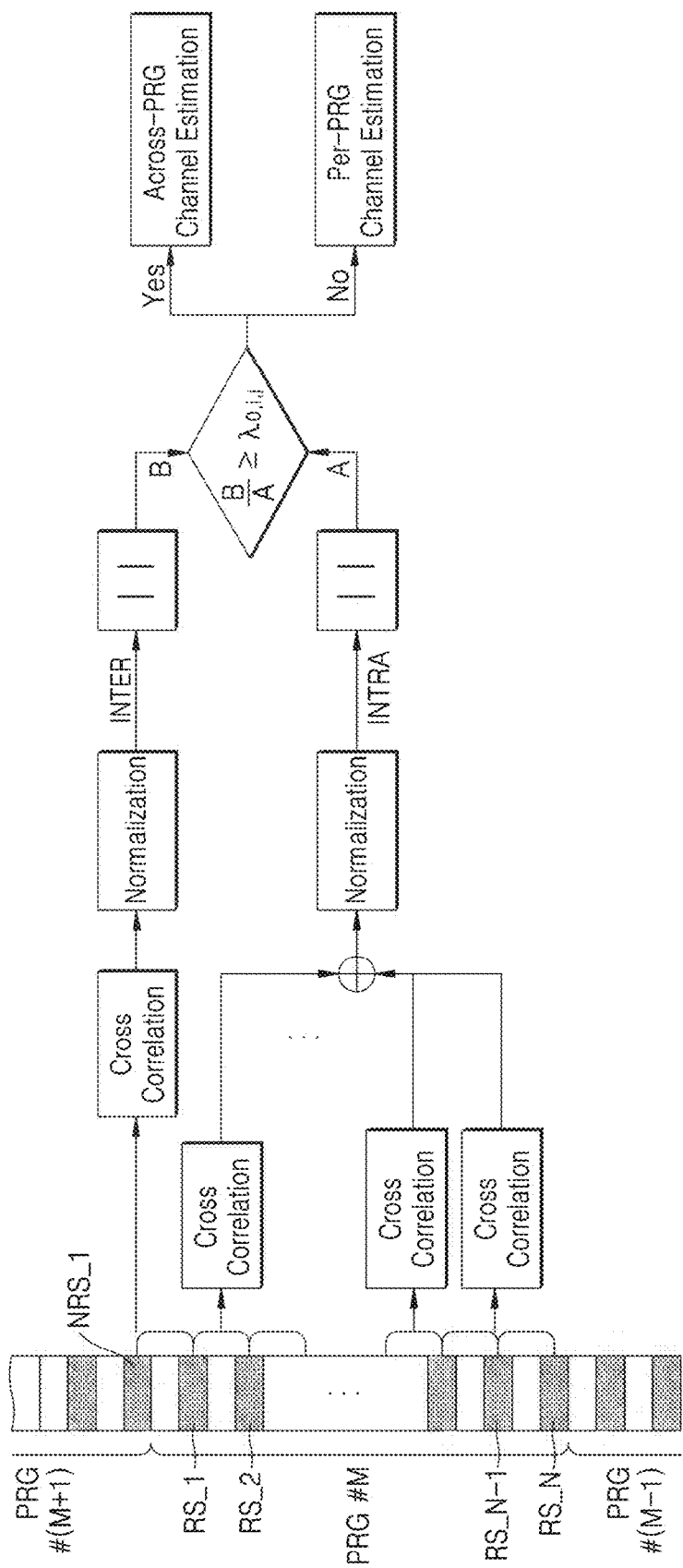
FIG. 16 is an example illustrating a precoding detection process according to embodiments.

FIG. 16 is an example illustrating a precoding detection process according to embodiments.

Referring to FIG. 16, an intra metric and an inter metric may be calculated. For example, when the number of RSs included in a PRG to which a target RE belongs is N, the RSs included in the PRG may be a first RS (RS_1) to an N-th RS (RS_N). A neighboring RS of the (M+1)-th PRG that is neighboring to the target RE but does not include the target RE may be a first neighboring RS (NRS_1). The carrier unit distance D between adjacent channel observations may be 2, and the carrier unit distance Δ between channel observations for which cross correlation is calculated may be 2.

In order to calculate the intra metric, cross correlation between RSs spaced apart by a unit distance within the PRG to which the target RE belongs may be calculated. For example, the cross correlation between the first RS (RS_1) and the second RS (RS_2) to the cross correlation between an (N−1)-th RS (RS_N−1) and the N-th RS (RS_N) may be sequentially or simultaneously (or contemporaneously) calculated. Thereafter, the intra metric may be obtained by summing and normalizing the calculated cross correlations. Because the carrier unit distance Δ between channel observations for calculating the cross correlation is 2, the electronic device 120 may calculate only the cross correlations between the first RS (RS_1) and the first neighboring RS (NRS_1) (e.g., a nearest neighboring RS) among the RSs included in an adjacent PRG. The inter metric may be obtained by calculating and normalizing the cross correlation between the first RS (RS_1) and the first neighboring RS (NRS_1). The estimation mode determination circuit 520 may perform adaptive channel estimation according to a first condition. That is, the estimation mode determination circuit 520 may divide the magnitude of the inter metric by the magnitude of the intra metric based on the first condition comparison circuit 521 and compare whether a divided value is greater than or equal to a threshold ratio. When the divided value is greater than or equal to the threshold ratio, because adjacent PRGs are based on the same precoding (or similar precoding), the channel estimation circuit 530 may perform channel estimation of the target RE by using not only the channel observation of the first RS (RS_1) but also the channel observation of the first neighboring RS (NRS_1) based on second channel estimation (e.g., across-PRG channel estimation). When the divided value is smaller than the threshold ratio, because adjacent PRGs are based on different precoding, the channel estimation circuit 530 may perform channel estimation of the target RE by using only channel observations of at least some of the first RS (RS_1) to the N-th RS (RS_N) included in the PRG to which the target RE belongs based on first channel estimation (e.g., per-PRG channel estimation) (e.g., without the channel observation of the first neighboring RS (NRS_1).

Figure 17:
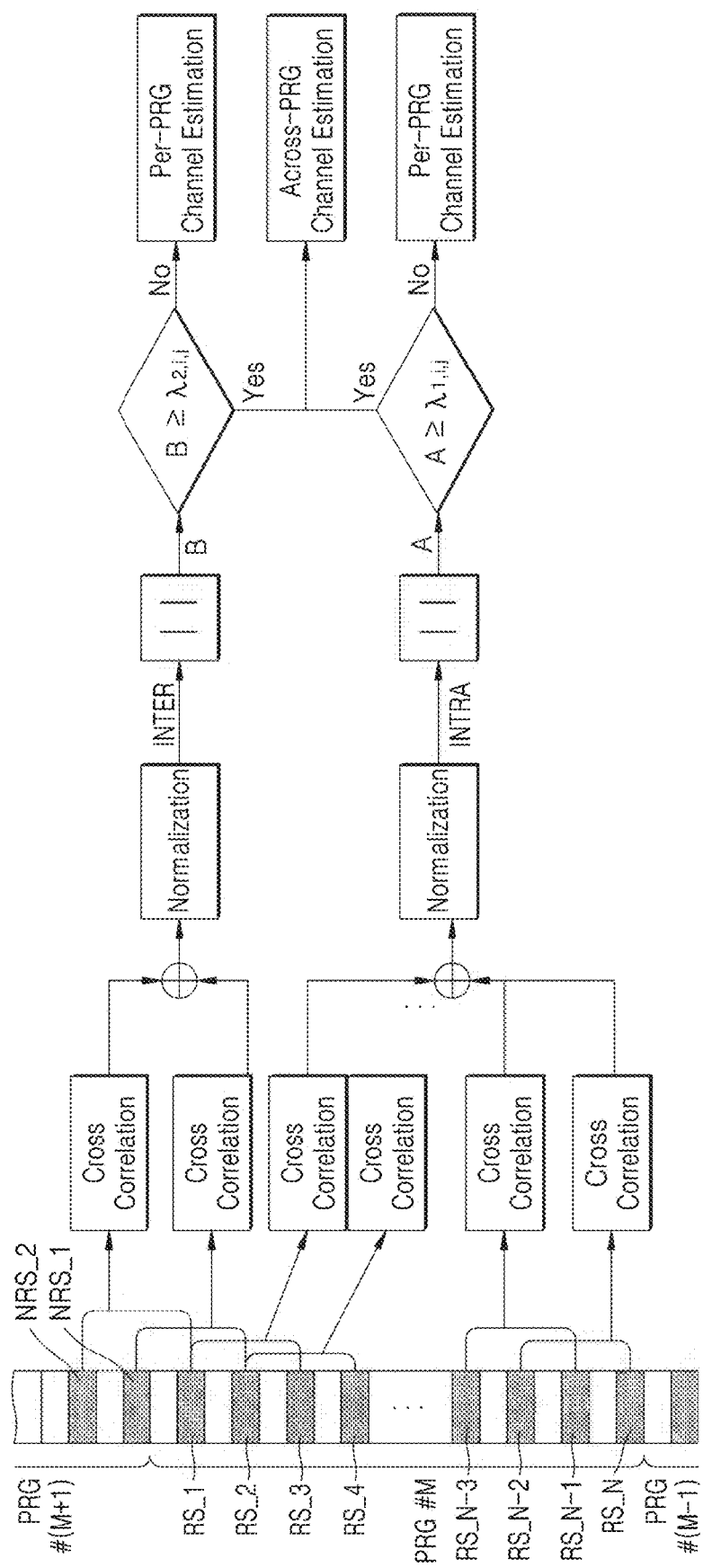
FIG. 17 is another example illustrating a precoding detection process according to embodiments.

FIG. 17 is another example illustrating a precoding detection process according to embodiments.

Referring to FIG. 17, an intra metric and an inter metric may be calculated. For example, when the number of RSs included in a PRG to which a target RE belongs is N, RSs included in the PRG may be the first RS (RS_1) to the N-th RS (RS_N). The RSs of the (M+1)-th PRG that are neighboring to the target RE but do not include the target RE may be the first neighboring RS (NRS_1) and a second neighboring RS (NRS_2). The carrier unit distance D between adjacent channel observations may be 4, and the carrier unit distance Δ between channel observations for which cross correlation is calculated may be 4.

In order to calculate the intra metric, cross correlation between RSs spaced apart by a unit distance within the PRG to which the target RE belongs may be calculated. For example, because the carrier unit distance Δ between channel observations for calculating the cross correlation is 4, the cross correlation between the first RS (RS_1) and a third RS (RS_3) to the cross correlation between a (N−2)-th RS (RS_N−2) and the N-th RS (RS_N) may be sequentially or simultaneously (or contemporaneously) calculated. Thereafter, the intra metric may be obtained by summing and normalizing the calculated cross correlations.

Because the carrier unit distance Δ between channel observations for calculating the cross correlation is 4, the first RS (RS_1) may calculate the cross correlation with the second neighboring RS (NRS_2) among the RSs included in an adjacent PRG, and the second RS (RS_2) may calculate the cross correlation with the first neighboring RS (NRS_1). The metric calculation circuit 510 may obtain the inter metric by summing and normalizing the cross correlation between (1) the first RS (RS_1) and the second neighboring RS (NRS_2), and (2) the cross correlation between the second RS (RS_2) and the first neighboring RS (NRS_1).

The estimation mode determination circuit 520 may perform adaptive channel estimation according to a second condition. That is, the estimation mode determination circuit 520 may compare whether the magnitude of the intra metric is greater than or equal to a first threshold value and whether the magnitude of the inter metric is greater than or equal to a second threshold value based on the second condition comparison circuit 523. When the magnitude of the inter metric is smaller than the second threshold value or the magnitude of the intra metric is smaller than the first threshold value, because adjacent PRGs are based on different precoding, the channel estimation circuit 530 may perform channel estimation of the target RE by using only channel observations of at least some of the first RS (RS_1) to the N-th RS (RS_N) included in the PRG to which the target RE belongs based on first channel estimation (e.g., per-PRG channel estimation). When the magnitude of the inter metric is greater than or equal to the second threshold value and simultaneously (or contemporaneously) the magnitude of the intra metric is greater than or equal to the first threshold value, because the adjacent PRGs are based on the same precoding (or similar precoding), the channel estimation circuit 530 may perform channel estimation of the target RE by using channel observations of at least some of the first RS (RS_1) to the N-th RS (RS_N) included in the PRG to which the target RE belongs as well as channel observations of the first neighboring RS (NRS_1) and the second neighboring RS (NRS_2) included in the adjacent PRG based on second channel estimation (e.g., across-PRG channel estimation).

Figure 18:
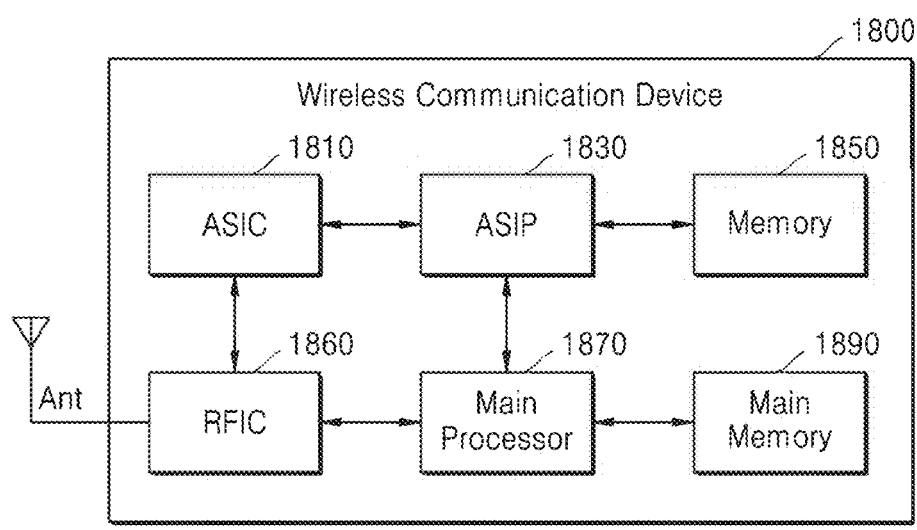
FIG. 18 is a block diagram of a wireless communication device according to embodiments.

FIG. 18 is a block diagram of a wireless communication device according to embodiments.

Referring to FIG. 18, a wireless communication device 1800 may include a modem (not shown) and a radio frequency integrated circuit (RFIC) 1860, and the modem may include an application specific integrated circuit (ASIC) 1810, an application specific instruction set processor (ASIP) 1830, a memory 1850, a main processor 1870, and/or a main memory 1890. The wireless communication device 1800 of FIG. 18 may be the electronic device 120 according to embodiments.

The RFIC 1860 may be connected to an antenna Ant, and may receive a signal from the outside and/or transmit a signal to the outside by using a wireless communication network. The ASIP 1830 is an integrated circuit customized for a specific purpose, and may support a dedicated instruction set for a specific application and execute instructions included in the instruction set. The memory 1850 may communicate with the ASIP 1830 and may store a plurality of instructions executed by the ASIP 1830 as a non-transitory storage device. For example, the memory 1850 may include, as a non-limiting example, any type of memory accessible by the ASIP 1830, such as random access memory (RAM), read only memory (ROM), tape, magnetic disk, optical disk, volatile memory, non-volatile memory, and combinations thereof.

The main processor 1870 may control the wireless communication device 1800 by executing the plurality of instructions. For example, the main processor 1870 may control the ASIC 1810 and the ASIP 1830, process data received through the wireless communication network, and/or process a user input to the wireless communication device 1800. The main memory 1890 may communicate with the main processor 1870 and may store a plurality of instructions executed by the main processor 1870 as a non-temporary storage device. For example, the main memory 1890 may include, as a non-limiting example, any type of memory accessible by the main processor 1870, such as RAM, ROM, tape, magnetic disk, optical disk, volatile memory, non-volatile memory, and combinations thereof.

Conventional devices and methods for performing channel estimation rely on channel observations of only reference signal symbols included in a PRG containing a target RE (a target PRG). However, in circumstances in which the target RE is located at an edge of the target PRG (e.g., assigned a frequency resource adjacent, or nearly adjacent, to frequency resources of a neighboring PRG), such channel estimation reliant on the channel observations of only those reference signal symbols included in the target PRG results in excessive channel estimation errors. Accordingly, the conventional devices and methods experience excessive communication failures as a result of such channel estimation errors.

However, according to embodiments, improved devices and methods are provided for performing channel estimation. For example, the improved devices and methods may determine whether a neighboring PRG applies the same precoding as (or a similar precoding to) that of the PRG containing a target RE (the target PRG). If so, the improved devices and methods may perform channel estimation relying on channel observations of reference signal symbols included in both the target PRG and the neighboring PRG. By utilizing the channel observations of reference signal symbols in both PRGs, in circumstances in which the target RE is located at an edge of the target PRG (e.g., assigned a frequency resource adjacent, or nearly adjacent, to frequency resources of the neighboring PRG), channel estimation is performed with reduced channel estimation errors as compared to that of the conventional devices and methods. Thus, the improved devices and methods overcome the deficiencies of the conventional devices and methods to at least reduce channel estimation errors and corresponding communication failures.

According to embodiments, operations described herein as being performed by the wireless communication system 10, the base station 110, the electronic device 120, the wireless communication circuit 210, the backhaul communication circuit 220, the control circuit 240, the communication circuit 310, the control circuit 330, the adaptive channel estimation circuit 335, the base station 410, the user terminal 420, the first transceiver 411, the second transceiver 412, the third transceiver 421, the fourth transceiver 422, the metric calculation circuit 510, the estimation mode determination circuit 520, the channel estimation circuit 530, the intra calculation circuit 511. the inter calculation circuit 513, the first condition comparison circuit 521, the second condition comparison circuit 523, the across-PRG channel estimation circuit 533, the per-PRG channel estimation circuit 531, the wireless communication device 1800, the RFIC 1860, the ASIC 1810, the ASIP 1830, and/or the main processor 1870 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium (e.g., the memory 230, the memory 320, the memory 1850 and/or the main memory 1890). A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail herein. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order.

As used herein the term "and/or" includes any and all combinations of one or more of the associated listed items. Although terms of "first" or "second" may be used to explain various components, the components are not limited to the terms. These terms should be used only to distinguish one component from another component. For example, a "first" component may be referred to as a "second" component, or similarly, and the "second" component may be referred to as the "first" component. Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While the inventive concepts have been particularly shown and described with reference to embodiments thereof, it will be understood that various changes in form and details may be made therein without departing from the spirit and scope of the following claims.

What is claimed is:

1. An electronic device comprising:
  processing circuitry configured to,
    calculate an intra metric based on cross correlation of a plurality of first reference signal symbols (RSs) included in a first precoding resource block group (PRG) to which a target resource element (RE) belongs, calculate an inter metric based on cross correlation of one or more second RSs and one or more among the plurality of first RSs, the one or more second RSs being included in a second PRG adjacent to the first PRG along a frequency axis of a physical channel, the one or more second RSs being in proximity to the target RE, and the physical channel being received from a base station, compare a first ratio between the intra metric and the inter metric with a threshold ratio to obtain a comparison result, and determine a channel estimation mode with respect to the target RE based on the comparison result.

2. The electronic device of claim 1, wherein the first ratio is a value obtained by dividing a magnitude of the inter metric by a magnitude of the intra metric.

3. The electronic device of claim 1, wherein the threshold ratio is variable based on a Doppler shift, a delay spread, and a channel selectivity.

4. The electronic device of claim 1, wherein the processing circuitry is configured to determine that first precoding of the first PRG is identical to second precoding of the second PRG based on the first ratio being greater than or equal to the threshold ratio.

5. The electronic device of claim 4, wherein the processing circuitry is configured to determine the channel estimation mode as a first estimation mode in response to determining that the first precoding and the second precoding are identical to each other, the first estimation mode including performing channel estimation on the target RE based on channel observations of at least some of the plurality of first RSs and the one or more second RSs.

6. The electronic device of claim 1, wherein the processing circuitry is configured to determine that first precoding of the first PRG is different from second precoding of the second PRG based on the first ratio being smaller than the threshold ratio.

7. The electronic device of claim 6, wherein the processing circuitry is configured to determine the channel estimation mode as a second estimation mode in response to determining that the first precoding and the second precoding are different from each other, the second estimation mode including performing channel estimation on the target RE based on channel observations of at least some of the plurality of first RSs.

8. An electronic device comprising:
processing circuitry configured to,
calculate an intra metric based on cross correlation of a plurality of first reference signal symbols (RSs) included in a first precoding resource block group (PRG) to which a target resource element (RE) belongs,
calculate an inter metric based on cross correlation of one or more second RSs and one or more among the plurality of first RSs, the one or more second RSs being included in a second PRG adjacent to the first PRG along a frequency axis of a physical channel, the one or more second RSs being in proximity to the target RE, and the physical channel being received from a base station,
perform a first comparison between a magnitude of the intra metric and a first threshold value to obtain a first comparison result,
perform a second comparison between a magnitude of the inter metric and a second threshold value to obtain a second comparison result, and
determine a channel estimation mode with respect to the target RE based on the first comparison result and the second comparison result.

9. The electronic device of claim 8, wherein each of the first threshold value and the second threshold value is variable based on a Doppler shift, a delay spread, and a channel selectivity.

10. The electronic device of claim 8, wherein the processing circuitry is configured to determine that first precoding of the first PRG is identical to second precoding of the second PRG based on,
the intra metric being greater than or equal to the first threshold value, and
the inter metric being greater than or equal to the second threshold value.

11. The electronic device of claim 10, wherein the processing circuitry is configured to determine the channel estimation mode as a first estimation mode in response to determining that the first precoding and the second precoding are identical to each other, the first estimation mode including performing channel estimation on the target RE based on channel observations of at least some of the plurality of first RSs and the one or more second RSs.

12. The electronic device of claim 8, wherein the processing circuitry is configured to determine that first precoding of the first PRG is different from second precoding of the second PRG based on,
the intra metric being smaller than the first threshold value, or
the inter metric being smaller than the second threshold value.

13. The electronic device of claim 12, wherein the processing circuitry is configured to determine the channel estimation mode as a second estimation mode in response to determining that the first precoding and the second precoding are different from each other, the second estimation mode including performing channel estimation on the target RE based on channel observations of at least some of the plurality of first RSs.

14. An operating method of an electronic device, the operating method comprising:
calculating an intra metric based on cross correlation of a plurality of first reference signal symbols (RSs) included in a first precoding resource block group (PRG) to which a target resource element (RE) belongs;
calculating an inter metric based on cross correlation between one or more second RSs and one or more among the plurality of first RSs, the one or more second RSs being included in a second PRG adjacent to the first PRG along a frequency axis of a physical channel, the one or more second RSs being in proximity to the target RE, the physical channel being received from a base station;
determining a channel estimation mode with respect to the target RE based on the intra metric and the inter metric to obtain a determined channel estimation mode; and
performing channel estimation on the target RE according to the determined channel estimation mode.

15. The operating method of claim 14, wherein the determining the channel estimation mode comprises:
comparing a first value with a threshold ratio, the first value being obtained by dividing a magnitude of the inter metric by a magnitude of the intra metric, the threshold ratio being variable based on a Doppler shift, a delay spread, and a channel selectivity; and one of,
- determining that first precoding of the first PRG is identical to second precoding of the second PRG based on the first value being greater than or equal to the threshold ratio, or
- determining that the first precoding of the first PRG is different from the second precoding of the second PRG based on the first value being smaller than the threshold ratio.

16. The operating method of claim 15, wherein the determining the channel estimation mode comprises determining a first mode for performing channel estimation on the target RE as the channel estimation mode based on channel observations of at least some of the plurality of first RSs and the one or more second RSs in response to determining the first precoding is identical to the second precoding.

17. The operating method of claim 15, wherein the determining the channel estimation mode comprises determining a second mode for performing channel estimation on the target RE as the channel estimation mode based on channel observations of at least some of the plurality of first RSs in response to determining the first precoding is different from the second precoding.

18. The operating method of claim 14, wherein the determining the channel estimation mode comprises:
- comparing a magnitude of the intra metric with a first threshold value;
- comparing a magnitude of the inter metric with a second threshold value, each of the first threshold value and the second threshold value being variable based on a Doppler shift, a delay spread, and a channel selectivity; and
- one of,
  - determining that first precoding of the first PRG is identical to second precoding of the second PRG based on,
    - the magnitude of the intra metric being greater than or equal to the first threshold value, and
    - the magnitude of the inter metric being greater than or equal to the second threshold value, or
  - determining that the first precoding of the first PRG is different from the second precoding of the second PRG based on,
    - the magnitude of the intra metric being smaller than the first threshold value, or
    - the magnitude of the inter metric being smaller than the second threshold value.

19. The operating method of claim 18, wherein the determining the channel estimation mode comprises determining a first mode for performing channel estimation on the target RE as the channel estimation mode based on channel observations of at least some of the plurality of first RSs and the one or more second RSs in response to determining the first precoding is identical to the second precoding.

20. The operating method of claim 18, wherein the determining the channel estimation mode comprises determining a second mode for performing channel estimation on the target RE as the channel estimation mode based on channel observations of at least some of the plurality of first RSs in response to determining the first precoding is different from the second precoding.

* * * * *